US006843553B2

(12) United States Patent
Ishii et al.

(10) Patent No.: US 6,843,553 B2
(45) Date of Patent: Jan. 18, 2005

(54) INK JET PRINTING METHOD AND PRINTING APPARATUS

(75) Inventors: Kazuo Ishii, Shizuoka (JP); Yusuke Nakazawa, Shizuoka (JP); Sadao Ohsawa, Shizuoka (JP); Eiichi Kato, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/741,071

(22) Filed: Dec. 21, 2000

(65) Prior Publication Data

US 2001/0022601 A1 Sep. 20, 2001

(30) Foreign Application Priority Data

| | | |
|---|---|---|
| Dec. 21, 1999 | (JP) | 11-363271 |
| Feb. 25, 2000 | (JP) | 2000-049686 |
| Mar. 1, 2000 | (JP) | 2000-056227 |

(51) Int. Cl.$^7$ .............................. B41J 2/06; G01D 11/00
(52) U.S. Cl. .............................. 347/55; 347/100
(58) Field of Search .............................. 347/55, 100, 112, 347/28

(56) References Cited

U.S. PATENT DOCUMENTS

| | | | | | |
|---|---|---|---|---|---|
| 4,314,263 | A | * | 2/1982 | Carley | 347/48 |
| 4,540,996 | A | * | 9/1985 | Saito | 347/43 |
| 4,752,784 | A | * | 6/1988 | Saito et al. | 347/55 |
| 4,794,463 | A | * | 12/1988 | Tamura et al. | 358/296 |
| 5,020,244 | A | * | 6/1991 | Smith | 34/633 |
| 5,412,411 | A | * | 5/1995 | Anderson | 347/28 |
| 5,428,384 | A | * | 6/1995 | Richtsmeir et al. | 347/102 |
| 5,502,464 | A | * | 3/1996 | Takahashi et al. | 346/25 |
| 5,539,440 | A | * | 7/1996 | Higuchi et al. | 347/112 |

FOREIGN PATENT DOCUMENTS

| | | | | |
|---|---|---|---|---|
| EP | 0 827 831 A2 | | 3/1998 | |
| EP | 0 844 087 A2 | | 5/1998 | |
| EP | 0 988 968 A1 | | 3/2000 | |
| GB | 2358834 A | | 8/2001 | |
| JP | 59-35950 | | 2/1984 | |
| JP | 362090253 | * | 4/1987 | 347/28 |
| JP | 03169644 | * | 7/1991 | 347/102 |
| JP | 11-10911 | | 1/1999 | |
| JP | 11-263018 | | 9/1999 | |
| JP | 11-269416 | | 10/1999 | |
| WO | WO 93/11866 | | 6/1993 | |
| WO | WO 00/73065 A1 | | 12/2000 | |

* cited by examiner

*Primary Examiner*—Michael S. Brooke
(74) *Attorney, Agent, or Firm*—Sughrue Mion, PLLC

(57) ABSTRACT

An ink jet printing method which comprises: directly forming an image on a printing medium on the basis of signals of image data; and fixing the image to produce a printed matter, wherein said image formation is carried out by an ink jet system of ejecting an oily ink by an electrostatic field. The method preferably further comprises cleaning an ink jet head, said cleaning step comprising: immersing said ink jet head in a cleaning solution; and applying voltage to said ink jet head. Alternatively, the method preferably further comprises, when a malfunction happens, either or both of stopping the image formation and eliminating a cause of the malfunction. Also disclosed are printing apparatuses suitably used for these methods.

24 Claims, 21 Drawing Sheets

INK JET PRINTING METHOD AND PRINTING APPARATUS

FIELD OF THE INVENTION

The present invention relates to a printing method of directly forming a printing image on a printing medium. More specifically, the invention relates to an ink jet printing method and a printing apparatus which provide excellent printed image quality by electrostatic system ink jet recording using an oily ink and which are capable of high-speed printing.

BACKGROUND OF THE INVENTION

As a printing method of forming a printing image on a printing medium on the basis of the signal of image data, there are an electrophotographic method, sublimation type and melting type heat transfer methods, and an ink jet method.

An electrophotographic method requires a process of forming an electrostatic latent image by electrostatic charge and exposure on a photosensitive drum, thus the system is complicated and an expensive apparatus is necessary.

A heat transfer method, although the apparatus is inexpensive, uses an ink ribbon hence running cost comes expensive, leaving waste materials behind.

On the other hand, in an ink jet method, as printing is performed directly on a printing medium by ejecting ink on only a necessary image part with an inexpensive apparatus, coloring materials can be effectively used and the running cost is inexpensive.

As a method of applying an ink jet technique to a printing system, e.g., a method of installing an ink jet printing apparatus on a rotary printing apparatus, and additionally printing variable numbers and marks on the same printing paper by an ink jet system is disclosed in JP-A-10-286939 (the term "JP-A" as used herein means an "unexamined published Japanese patent application").

However, it is more preferred that an ink jet printing technique is capable of printing high-degree image data like a photographic image. However, in an ink jet technique which ejects a water base ink or an organic solvent base ink containing conventional dyes or pigments as the coloring materials by making use of pressure, since droplets containing a large amount of solvent are ejected, a printed image blurs if expensive special printing paper is not used.

Therefore, when printing is performed on usual printing paper or non-absorptive plastic sheet, a high quality printed image cannot be obtained.

Further, as one of ink jet techniques, there is a method of forming an image which comprises a step of heat-melting an ink which is in a solid state at normal temperature and ejecting the liquefied ink. Blurring of printed images can be reduced with this ink, but the ejection of minute droplets is difficult since the ink viscosity at ejecting time is high, and each dot image obtained is large in area and thick, thus a highly precise image cannot be formed.

SUMMARY OF THE INVENTION

The present invention is to solve the above-described problems.

Accordingly, an object of the present invention is to provide an ink jet printing method capable of printing a printed matter having a sharp and high quality image with an inexpensive apparatus and a simple technique.

Another object of the present invention is to provide a printing apparatus suitable for the ink jet printing method.

Other objects and effects of the present invention will become more apparent from the following description.

The above-described objects of the present invention have been achieved by providing an ink jet printing method which comprises directly forming an image on a printing medium on the basis of signals of image data; and fixing the image to produce a printed matter, wherein said image formation is carried out by an ink jet system of ejecting an oily ink by an electrostatic field.

In a first preferred embodiment, cleaning of an ink jet head is performed, said cleaning step comprising: immersing said ink jet head in a cleaning solution; and applying voltage to said ink jet head.

In a second preferred embodiment, either or both of stopping the image formation and eliminating a cause of the malfunction is performed, when a malfunction happens.

Specifically, the present invention relates to the following ink jet printing methods and printing apparatuses.

(1) An ink jet printing method which comprises:

directly forming an image on a printing medium on the basis of signals of image data; and fixing the image to produce a printed matter, wherein said image formation is carried out by an ink jet system of ejecting an oily ink by an electrostatic field.

(2) The ink jet printing method according to the above item (1), further comprising cleaning an ink jet head, said cleaning step comprising:

immersing said ink jet head in a cleaning solution; and applying voltage to said ink jet head.

(3) The ink jet printing method according to the above item (1), further comprising, when a malfunction happens, either or both of stopping the image formation and eliminating a cause of the malfunction.

(4) The ink jet printing method according to the above item (3), wherein at least one of the following steps is performed:

removing dusts on the surface of said printing medium either of both of before and during printing onto said printing medium; and cleaning said ink jet head at least after printing is finished.

(5) The ink jet printing method according to any one of the above items (1) to (4), wherein said oily ink is a dispersion comprising at least:

a nonaqueous solvent having an intrinsic electrical resistance of $10^9$ Ω·cm or more and a dielectric constant of 3.5 or less; and colored particles dispersed in said solvent.

(6) An ink jet printing apparatus comprising:

an image-forming member which directly forms an image on a printing medium on the basis of signals of image data; and an image-fixing member which fixes the formed image to obtain a printed matter, wherein said image-forming member comprises an ink jet imaging unit comprising an ink jet head for ejecting an oily ink by an electrostatic field.

(7) The ink jet printing apparatus according to the above item (6), further comprising a cleaning member which cleans said ink jet head.

(8) The ink jet printing apparatus according to the above item (7), wherein said cleaning member performs cleaning by applying voltage to the ink jet head which is immersed in a cleaning solution.

(9) The ink jet printing apparatus according to the above item (6), further comprising at least one of a malfunction detecting member and a malfunctioning cause eliminating member, wherein according to an output from said malfunction detecting member, the image formation is temporarily stopped or said malfunctioning cause eliminating member operates.

(10) The ink jet printing apparatus according to the above item (9), wherein said malfunction detecting member is a unit which detects adhesion of a foreign matter on said ink jet head.

(11) The ink jet printing apparatus according to the above item (9) or (10), wherein said malfunction detecting member is a unit which detects at least one of a dust in said ink jet printing apparatus and a dust on said printing medium.

(12) The ink jet printing apparatus according to any one of the above items (9) to (11), wherein said malfunction detecting member detects vibration of at least one of said ink jet printing apparatus and said ink jet head.

(13) The ink jet printing apparatus according to any one of the above items (6) to (12), wherein said oily ink is a dispersion comprising at least:

a nonaqueous solvent having an intrinsic electrical resistance of $10^9$ Ω·cm or more and a dielectric constant of 3.5 or less; and colored particles dispersed in said solvent.

(14) The ink jet printing apparatus according to any one of the above items (6) to (13), further comprising a dust-removing member which removes a dust on the surface of said printing medium either or both of before and during printing on the printing medium.

(15) The ink jet printing apparatus according to any one of the above items (6) to (14), further comprising a counter drum which is arranged at a position opposed to said ink jet head via said printing medium and is rotatable so as to move said printing medium upon the image formation.

(16) The ink jet printing apparatus according to the above item (15), wherein said ink jet head has a single channel head or multi-channel head and is movable in an axis direction of said counter drum.

(17) The ink jet printing apparatus according to any one of the above items (6) to (14), further comprising at least one pair of capstan rollers for conveying said printing medium upon the image formation with being put therebetween.

(18) The ink jet printing apparatus according to the above item (17), wherein said ink jet head has a single channel head or multi-channel head and is movable in an orthogonal direction to said conveyance direction of the printing medium.

(19) The ink jet printing apparatus according to the above item (15) or (17), wherein said ink jet head has a full line head having a length substantially the same as the width of said printing medium.

(20) The ink jet printing apparatus according to any one of the above items (6) to (19), wherein said ink jet imaging unit further comprises an ink feeding member which feeds said oily ink to said ink jet head.

(21) The ink jet printing apparatus according to the above item (20), wherein said ink jet imaging unit further comprises an ink recovering member which recovers said oily ink from said ink jet head to circulate said oily ink.

(22) The ink jet printing apparatus according to any one of the above items (6) to (21), wherein said ink jet imaging unit further comprising an ink tank for storing said oily ink and a stirring member which stirs said oily ink in said ink tank.

(23) The ink jet printing apparatus according to any one of the above items (6) to (22), wherein said ink jet imaging unit further comprises an ink temperature controller for controlling the temperature of said oily ink in the ink tank.

(24) The ink jet printing apparatus according to any one of the above items (6) to (23), wherein said ink jet imaging unit further comprises an ink concentration controller for controlling the concentration of said oily ink.

DETAILED DESCRIPTION OF THE INVENTION

The present invention is described in detail below.

The present invention has a feature that an image is formed by an ink jet method of ejecting an oily ink by means of an electrostatic field on a printing medium which is fed to a printing apparatus.

The ink jet method according to the present invention is the method disclosed in WO 93/11866. An ink having high resistance comprising at least colored particles dispersed in an insulating solvent is used in this ink jet method. The agglomerates of the colored particles are formed at the jetting position by impressing a strong electrical field on the oily ink at the jetting position, and the agglomerates are ejected from the jetting position by electrostatic means. The colored particles are thus ejected as highly concentrated agglomerates, and the ink droplets contain only a small amount of a solvent. Thus, a dense and sharp image can be formed on a printing paper or a printing plastic film used as a recording medium without causing blurring.

Further, in the ink jet method according to the present invention, the size of an ejected ink droplet is determined by the size of the tip of a jet electrode or the conditions of forming an electrical field. Therefore, if a small jet electrode and proper electrical field-forming conditions are used, a small ink droplet can be obtained without reducing a jet nozzle diameter or a slit width.

Accordingly, the control of a small image is possible without causing clogging of a jet head by ink, and a printed matter having a sharp and high quality image can be obtained according to the ink jet printing method of the present invention.

Examples of the constitution of the printing apparatus for use in the ink jet printing method according to the present invention are described below, but the present invention is not limited thereto.

FIGS. 1 to 6 are schematic diagrams each showing the constitution of the printing apparatus for imaging with moving a printing medium by the rotation of a counter drum according to the present invention.

Figure 1:
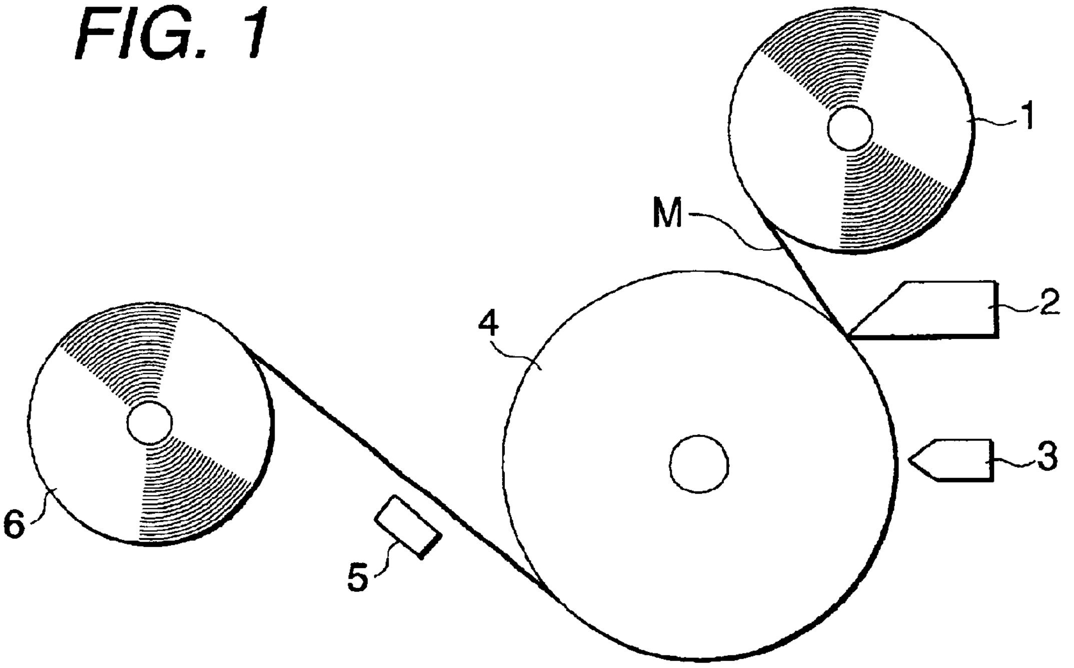
FIG. 1 is a schematic diagram showing the constitution of a web type printing apparatus for performing single-sided monochromatic printing, which is an example of the ink jet printing apparatus according to the present invention.
Figure 2:
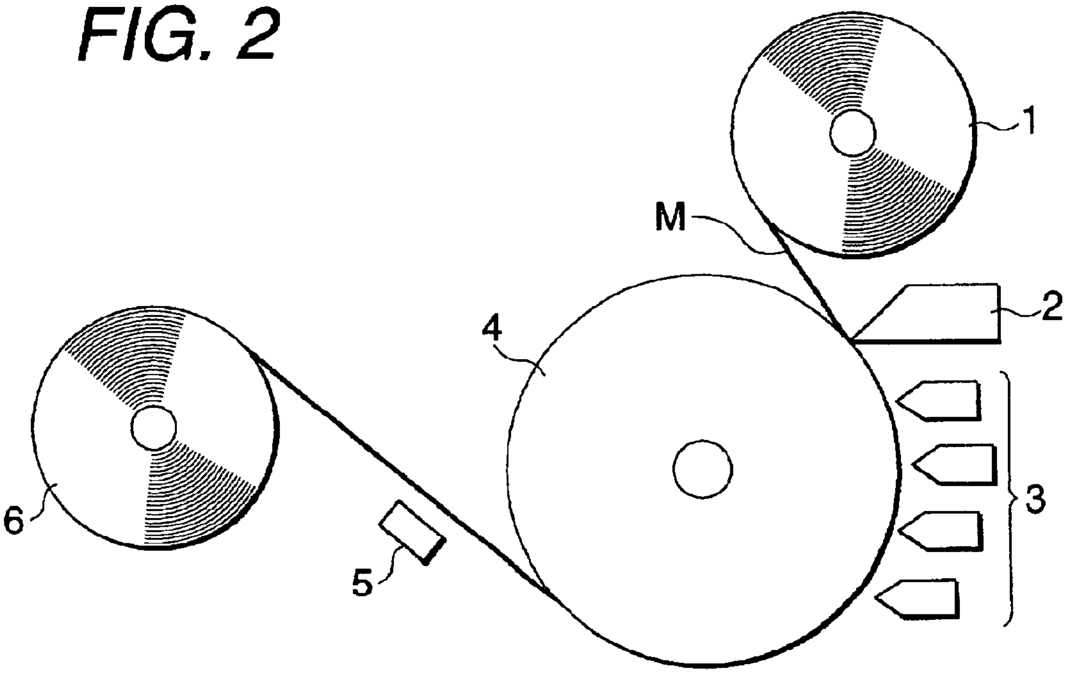
FIG. 2 is a schematic diagram showing the constitution of a web type printing apparatus for performing single-sided four-color printing, which is another example of the ink jet printing apparatus according to the present invention.
Figure 3:
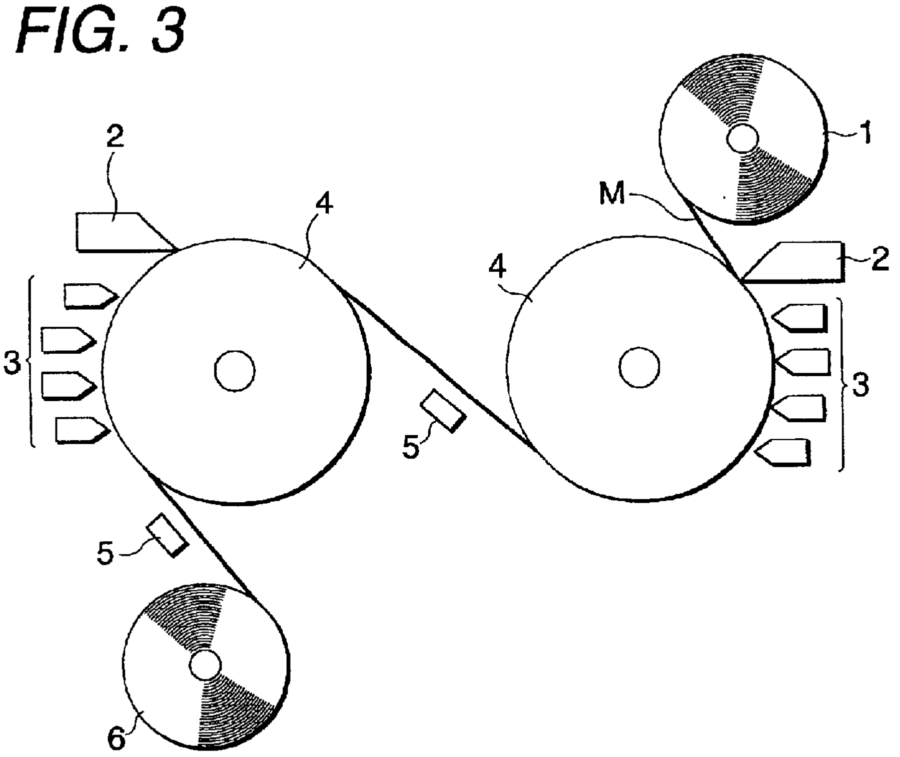
FIG. 3 is a schematic diagram showing the constitution of a double-sided four-color printing apparatus according to another example of the ink jet printing apparatus of the present invention.
Figure 4:
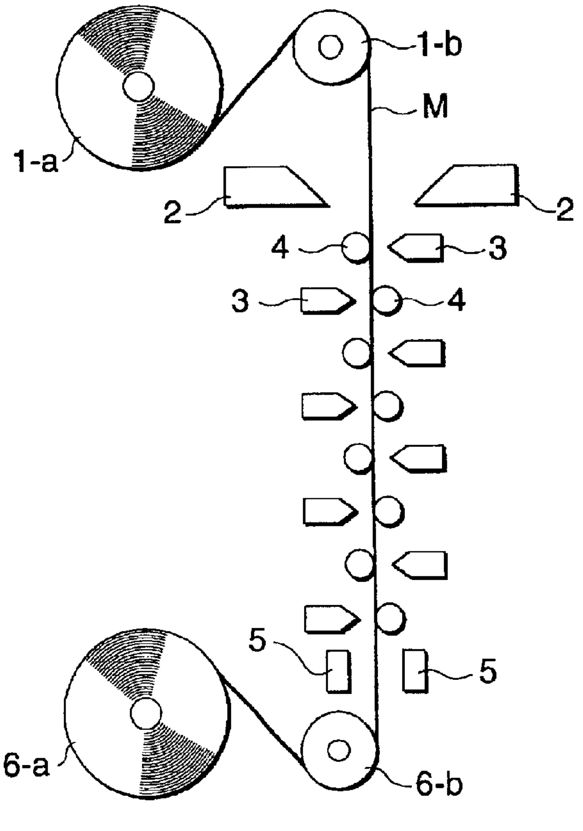
FIG. 4 is a schematic diagram showing the constitution of a double-sided four-color printing apparatus according to another example of the ink jet printing apparatus of the present invention.

FIGS. 1 to 4 are schematic diagrams each showing the constitution of a web type printing apparatus stretching a rolled printing medium by a counter drum, a printing medium-feeding roll and a printing medium-winding roll or a guide roll. FIG. 1 is a schematic diagram showing the constitution of a web type printing apparatus for performing single-sided monochromatic printing, FIG. 2 is a schematic diagram showing the constitution of a web type printing apparatus for performing single-sided four-color printing, and FIGS. 3 and 4 are schematic diagrams each showing the constitution of a web type printing apparatus for performing double-sided four-color printing.

Figure 5:
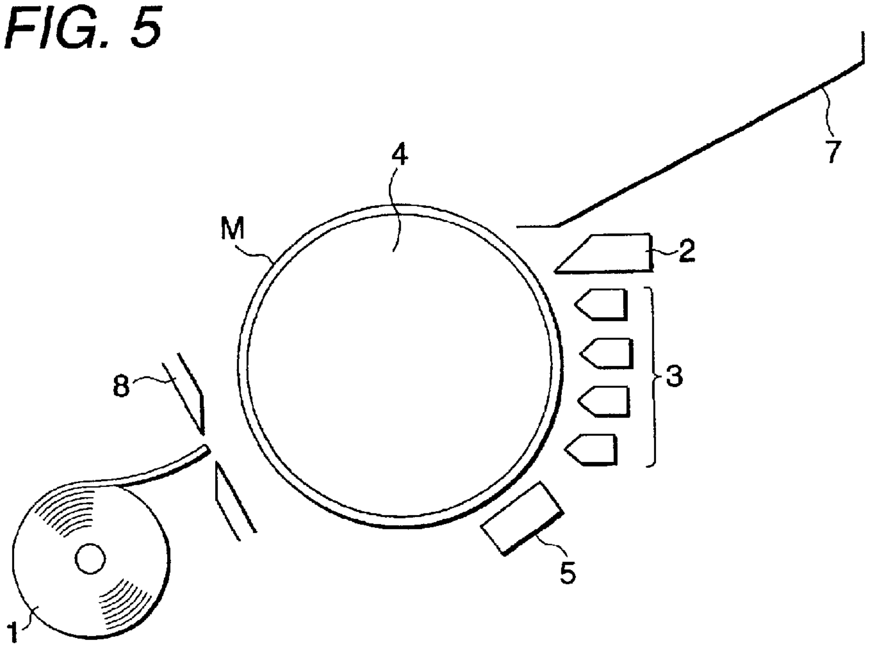
FIG. 5 is a schematic diagram showing the constitution of a single-sided four-color printing apparatus according to another example of the ink jet printing apparatus of the present invention, which performs printing by cutting a rolled printing medium and winding the cut printing medium round the counter drum.
Figure 6:
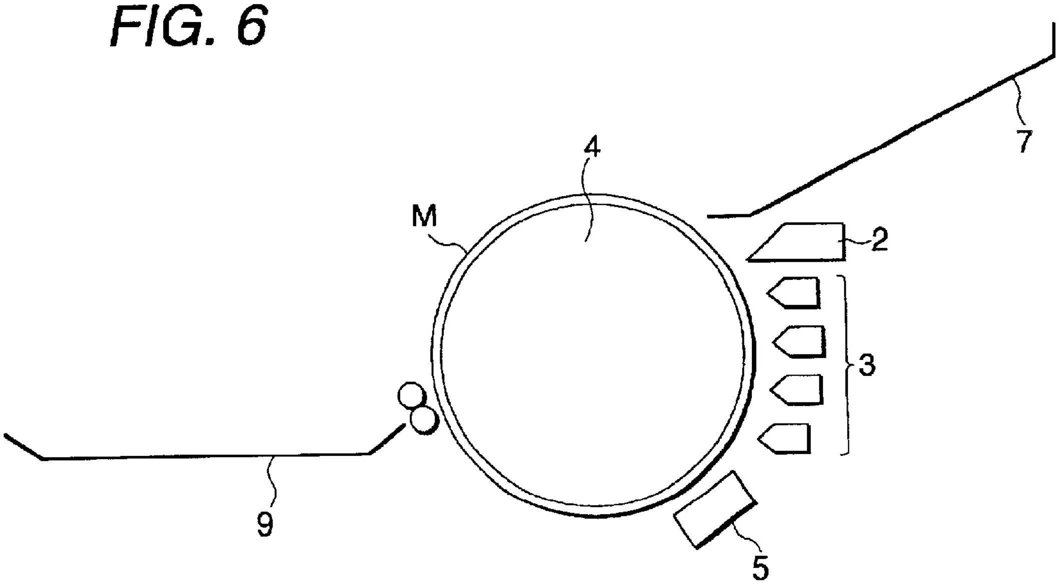
FIG. 6 is a schematic diagram showing the constitution of a printing apparatus of another example according to the ink jet printing apparatus of the present invention, which uses a sheet state recording medium.

FIG. 5 is a schematic diagram showing the constitution of a printing apparatus for performing single-sided four-color printing by cutting a rolled printing medium and winding the cut printing medium round the counter drum, and FIG. 6 is a schematic diagram showing the constitution of a printing apparatus using a sheet state recording medium.

Figure 7:
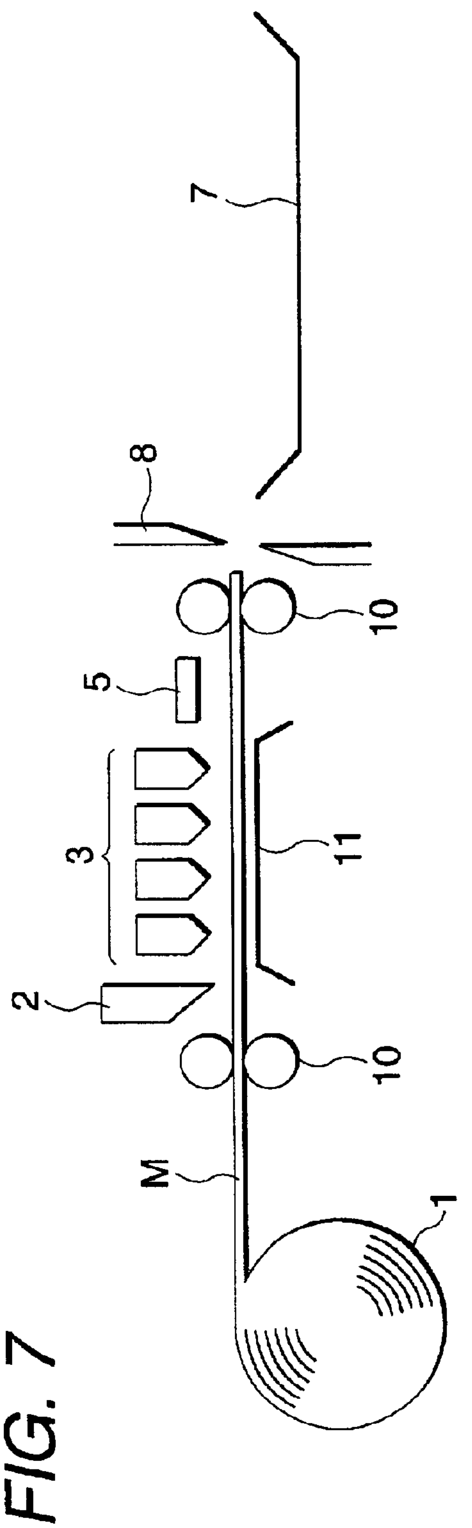
FIG. 7 is a schematic diagram showing the constitution of a printing apparatus according to another example of the ink jet printing apparatus of the present invention, which performs imaging by conveying a rolled printing medium with putting the printing medium between a pair of capstan rollers.
Figure 8:
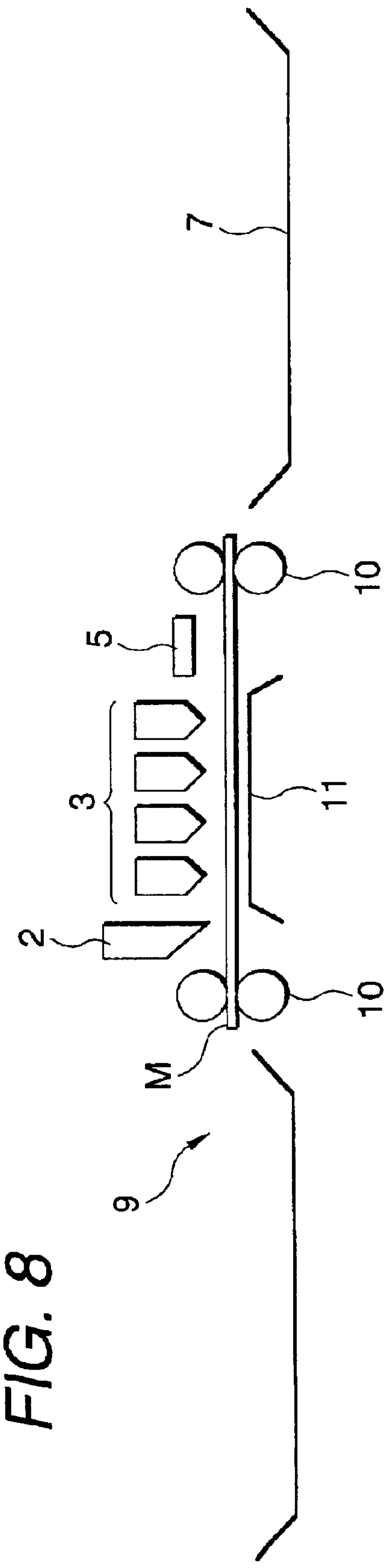
FIG. 8 is a schematic diagram showing the constitution of a printing apparatus according to another example of the ink jet printing apparatus of the present invention, which performs imaging by conveying a sheet state recording medium with putting the printing medium between a pair of capstan rollers.

On the other hand, FIGS. 7 and 8 are schematic diagrams each showing the constitution of a printing apparatus for performing imaging by conveying a printing medium with putting the printing medium between a pair of capstan rollers according to the present invention. FIG. 7 is a schematic diagram showing a printing apparatus using a rolled printing medium, and FIG. 8 is a schematic diagram showing a printing apparatus using a sheet state recording medium.

Figure 9:
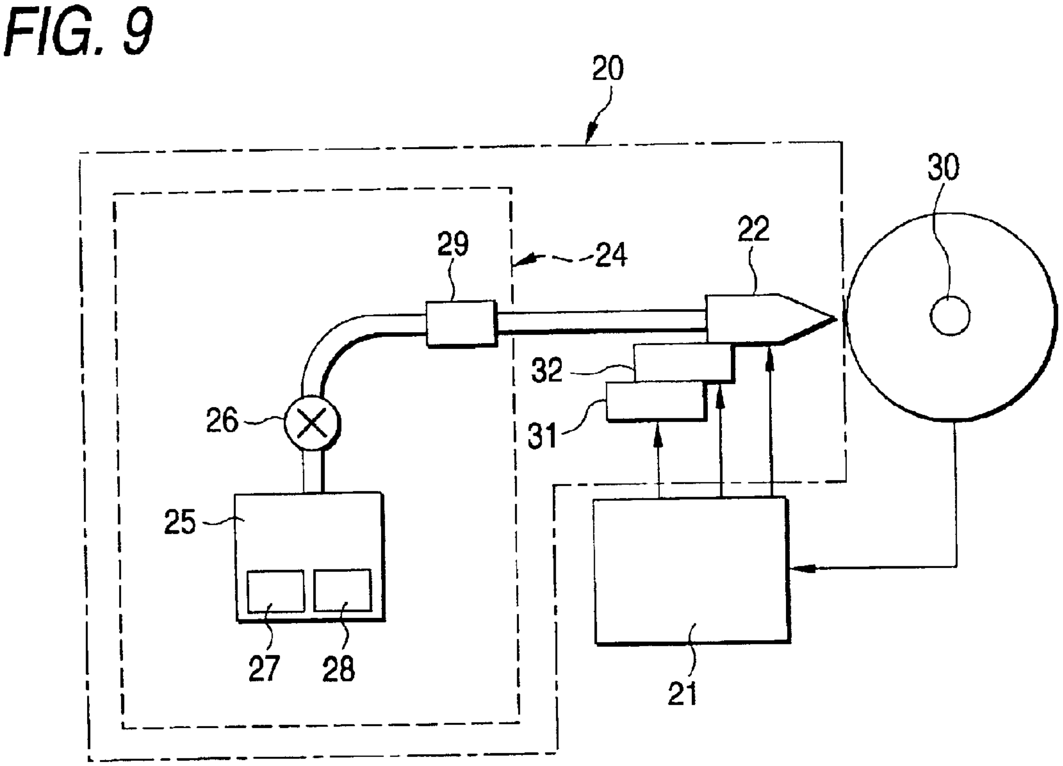
FIG. 9 is a schematic diagram of an imaging unit of the ink jet printing apparatus according to the present invention, including a controlling part, an ink-feeding part, and a head distancing/approximating mechanism.

FIG. 9 is a schematic diagram of an imaging unit including controlling parts, an ink-feeding part, and a head distancing/approximating mechanism. FIGS. 10 to 16 are diagrams each showing the ink jet recording unit mounted on the imaging unit shown in FIG. 9.

In the first place, the printing process according to the present invention is described with referring to the diagram of the printing apparatus for performing single-sided monochromatic printing on a rolled printing medium shown in FIG. 1.

The ink jet printing apparatus shown in FIG. 1 (hereinafter sometimes referred to as "printing apparatus") comprises rolled printing medium-feeding roll 1, dust and paper powder-removing member 2, imaging unit 3, counter (imaging) drum 4 arranged at the position opposite to imaging unit 3 with a printing medium therebetween, fixing member 5, and printing medium-winding roll 6.

After removing dusts and the like on the printing medium delivered from the printing medium-feeding roll by means of dust and paper powder-removing member 2, an ink is imagewise ejected from the ink jet head (described later) of imaging unit 3 to the printing medium on imaging drum 4, thus a printing image is recorded. After fixing the image on the printing medium by fixing member 5, the printing medium which finished printing is wound round printing medium-winding roll 6.

Counter (imaging) drum 4 for use in the present invention is comprised of a metallic roll, a roll having an electrically conductive rubber layer on the surface, or an insulating drum of, e.g., plastics, glass or ceramics, having a metallic layer on the surface thereof provided by deposition or metal plating as the counter electrode to the ink jet electrode of the ink jet part. Thus, an effective electrical field can be formed between counter (imaging) drum 4 and the ink jet part of imaging unit 3. It is also effective to provide a heating member on imaging drum 4 and increase the temperature of the drum for the purpose of improving imaging quality. Rapid fixing of the ejected ink droplets on the printing medium i s accelerated by this measure and blurring is further restrained.

Further, the physical properties of the ejected ink droplets on the printing medium are controlled by making drum temperature constant, as a result, stable and uniform dot formation becomes possible. For making drum temperature constant, it is more preferred to provide a cooling member.

As the removing member of dusts and paper powders, a non-contacting system such as suction removal, removal by blowing-off, electrostatic removal, etc., and a contacting system using a brush and a roller, etc., can be used.

In the present invention, air suction, blowing-off by air or a combination of them is used.

Imaging unit 3 has ink jet recording unit 20 as shown in FIG. 9. In ink jet recording unit 20, an oily ink is ejected on the printing medium to form an image by an electrostatic field formed between ink jet head 22 and counter drum 4 corresponding to the image data sent out of image data operation-controlling unit 21.

Image data operation-controlling unit 21 receives image data from an image scanner, a magnetic disc unit and an image data transmission unit, performs color separation, performs division operation of proper pixel numbers and gradation numbers on the basis of the separated data, and distributes them to each head.

Further, image data operation-controlling unit 21 performs operation of dot area rate by using ink jet head 22 of ink jet recording unit 20 (see FIG. 10, described later) for making a dot image of an oily ink image.

As described later, image data operation-controlling unit 21 moves ink jet head 22 and controls the ejection timing of an oily ink and, if necessary, controls the actuation timing of the printing medium as well.

The printing process according to the present invention will be described in detail below with referring to the printing apparatuses shown in FIGS. 1 and 9.

The printing medium sent out of the printing medium-feeding roll is given tension by the driving of the printing medium-winding roll and brought into contact with the imaging (counter) drum, by which the printing medium web can be prevented from damaging by vibrating and touching the ink jet recording unit at imaging time.

Further, it is also possible to prevent the printing medium from touching the ink jet recording unit by arranging a member of bringing the printing medium into close contact with the imaging (counter) drum only in close vicinity of the imaging position of the ink jet recording unit and actuating this member at least when imaging is performed. Specifically, for example, arranging pressing rollers, guides and electrostatic adsorption at the upper stream and the lower stream of the imaging position of the imaging drum is effective.

The image data from the magnetic disc unit and the like are given to image data operation-controlling unit 21, and image data operation-controlling unit 21 performs the operation of the ejection position of an oily ink and the dot area rate at that position in accordance with the input image data. These operation data are once deposited in a buffer. Image data operation-controlling unit 21 brings ink jet head 22 to the position near the printing medium which is in contact with the imaging drum by head distancing/approximating unit 31. The predetermined distance between ink jet head 22 and the surface of the imaging drum is maintained during imaging by mechanical distance control such as a knocking roller or by the control of a head distancing/approximating unit by the signals from an optical distance detector. Ink jet head 22 may comprise a single channel head, multi-channel heads, or full line heads.

When the ink jet head comprises a single channel head or multi-channel heads, the ink jet part is arranged almost in parallel with the conveyance direction of the printing medium, and main scanning is performed by the movement of the ink jet head(s) in the axis direction of the counter drum, and sub-scanning is performed by the rotation of the counter drum, to thereby effect printing. The movements of the counter drum and the ink jet head(s) are controlled by image data operation-controlling unit 21, and the ink jet head(s) ejects(eject) an oily ink on the printing medium on the basis of the ejection position and the dot area rate obtained by the above image data operation. Thus, a dot image is imaged on the printing medium with the oily ink in accordance with the variable density of the printing original. This action continues until a predetermined ink image is formed on the printing medium.

On the other hand, when ink jet head 22 comprises full line heads having a length substantially the same with the width of the drum, the ink jet part is arranged almost in orthogonal direction to the conveyance direction of the printing medium, and an oily ink image is formed by passing of the printing medium through the imaging part by the rotation of the counter drum, to thereby effect printing.

After completion of printing, if necessary, ink jet head 22 is evacuated so as to part from the position contiguous to the imaging drum for the purpose of protecting ink jet head 22. At this time, ink jet head 22 may be distanced alone but ink jet head 22 may be distanced together with ink-feeding part 24.

This head distancing/approximating unit acts so as to make the ink jet head apart from the imaging drum at least by 500 μm at time of not imaging. The distancing action may be a sliding type, or the head may be fixed to the arm fixed to some axis and move like a pendulum by the movement of the arm with the turns of the axis. The head can be protected from physical damage or staining by thus evacuating during the time of non-imaging, thus long duration of life can be accomplished.

Further, an oily ink image formed is strengthened by fixing member 5. As the ink-fixing member, well-known means, e.g., heating fixation, solvent fixation, etc., can be used. In heating fixation, irradiation with an infrared lamp, a halogen lamp or a xenon flash lamp, hot air fixation utilizing a heater, or heat roll fixation are generally used. Flash fixation using a xenon lamp etc. is well-known as the fixing technique of a toner in electrophotography and is advantageous in that fixation can be performed in short time. When a laminate paper is used, since the water content in the paper evaporates suddenly and causes a phenomenon called blister, i.e., unevenness occurs on the surface of the paper, it is preferred for the purpose of inhibiting blister to arrange a plurality of fixing apparatus and vary electric power supply and/or the distances from the fixing apparatus to the recording medium so that the temperature of the paper gradually increases.

In solvent fixation, an oily ink image is sprayed with a solvent such as methanol or ethyl acetate which can solve the resin components in the ink, or exposed to the vapor of such a solvent, and surplus vapor of the solvent is recovered.

In addition, it is desired that the image on the printing medium is maintained so as not to come into contact with anything during the process of from the oily ink image formation by ink jet head 22 to the fixation by fixing member 5.

FIGS. 2 to 4 are constitutional examples of the printing apparatuses for performing single-sided and double-sided four-color printing, but explanations are omitted since their principles of operation can be easily analogized from the above apparatus for single-sided monochromatic printing.

Constitutional examples of the units for four-color printing are shown in FIGS. 2 to 4, but the present invention is not limited thereto and number of colors can be arbitrarily selected according to necessity.

FIGS. 5 and 6 are other constitutional examples according to the present invention and they are diagrams each showing the unit having automatic discharger 7 and performing printing with winding the printing medium around the counter drum. FIG. 6 is a constitutional example of the unit having automatic feeder 9 and using a sheet-like printing medium. The constitutional example of a unit using a rolled printing medium shown in FIG. 5 is explained below.

In the first place, a printing medium fed by printing medium-feeding roll 1 and cut in an arbitrary size by cutter 8 is loaded on a counter drum. At this time, the printing medium is closely fixed on the drum by means of well-known grippers of the top and bottom of a sheet, mechanical means such as air aspirators, or electrostatic means, by which the printing medium can be prevented from damaging by flapping of the bottom of the paper against ink jet imaging unit 3 during imaging.

Further, the printing medium can be prevented from touching the ink jet recording unit by arranging a member of bringing the printing medium into close contact with the counter drum only in close vicinity of the imaging position of the ink jet recording unit and actuating this member at least when imaging is performed. Specifically, for example, there is a method of arranging pressing rollers at the upper stream and the lower stream of the imaging position of the counter drum.

Further, it is desired to keep the head apart from the printing medium when imaging is not performed, by which the printing medium can be effectively prevented from damaging by touching the ink jet imaging unit during imaging.

Ink jet head 22 may comprise a single channel head, multi-channel heads, or full line heads, and main scanning is performed by the rotation of counter drum 4. When the ink jet head comprises multi-channel heads or full line heads having a plurality of ink jet parts, the ink jet parts are arranged in the direction of the axis of counter drum 4.

Further, when a single channel head or multi-channel heads are used as ink jet head 22, ink jet head 22 is moved continuously or in order in the axis direction of the counter drum by image data operation-controlling unit 21, and an oily ink is ejected on the printing medium loaded on drum 11 on the basis of the ejection position and the dot area rate obtained by the operation of image data operation-controlling unit 21. Thus, a dot image is imaged on the printing medium with the oily ink in accordance with the variable density of the printing original. This action continues until a predetermined oily ink image is formed on the printing medium.

On the other hand, when ink jet head 22 comprises full line heads having a length substantially the same with the width of the drum, an oily ink image is formed on the printing medium and a printed matter is obtained every one rotation of the drum. The positional accuracy in the main scanning direction can be heightened and high-speed imaging can be effected by performing main scanning by drum rotation. The printing medium thus printed is subjected to fixation by fixing member 5, and discharged from automatic discharger 7.

Constitutional examples of the printing apparatuses for performing single-sided four-color printing have been shown but the present invention is not limited thereto and number of colors, single-sided/double-sided printing and the constitutions of the printing apparatuses can be arbitrarily selected according to necessity.

On the other hand, FIGS. 7 and 8 are schematic diagrams each showing the constitution of printing apparatus for performing imaging by conveying a printing medium with putting the printing medium between a pair of capstan rollers according to the present invention. FIG. 7 is a schematic diagram showing a printing apparatus using a rolled printing medium, and FIG. 8 is a schematic diagram showing a printing apparatus using a sheet state recording medium.

Overall constitution of the printing apparatus for performing single-sided four-color printing on the rolled printing medium shown in FIG. 7 is explained below. Printing medium M is conveyed with being put between two pairs of capstan rollers 10 and imaged by ink jet imaging unit 3 on the basis of the data of proper pixel numbers and gradation numbers obtained by division operation of image data operation-controlling unit (symbol 21 in FIG. 9). At the part where imaging by ink jet imaging unit 3 is performed, it is preferred to provide earth member 11 as the counter electrode of the ink jet electrode in electrostatic field ejection, by which imaging becomes easier.

In FIG. 7, sheet cutter 8 is provided at the upper stream of automatic discharger 7 for cutting the rolled printing medium, but a sheet cutter can be arranged at arbitrary place.

In the next place, the producing process of printed matters with the printing apparatus according to the present invention will be explained in further detail with referring to FIG. 7.

In the first place, a printing medium is conveyed by capstan rollers 10. The printing medium can be prevented from damaging by flapping of the top and bottom of the printing medium against ink jet imaging unit 3 at this time by providing a printing medium guide member not shown on the figure, according to necessity. In addition, the printing medium can also be prevented from touching the ink jet imaging unit by arranging a member for not loosening the printing medium only in the vicinity of the imaging position of the ink jet recording unit and actuating this member at least when imaging is performed. Specifically, for example, there is a method of arranging pressing rollers at the upper stream and the lower stream of the imaging position.

Further, it is desired to keep the head apart from the printing medium when imaging is not performed, by which the printing medium can be effectively prevented from damaging by touching the ink jet imaging unit.

The image data from the magnetic disc unit and the like are given to image data operation-controlling unit 21 shown in FIG. 9, and image data operation-controlling unit 21 performs the operation of the ejection position of an oily ink and the dot area rate at that position in accordance with the input image data. These operation data are once deposited in a buffer.

Image data operation-controlling unit 21 moves ink jet head 22, controls the ejection timing of the oily ink, and controls the actuation timing of the capstan rollers and, at the same time, brings ink jet head 22 to the position near the printing medium by head distancing/approximating unit 31. The predetermined distance between ink jet head 22 and the surface of the printing medium is maintained during imaging by mechanical distance control such as a knocking roller or by the control of a head distancing/approximating unit by the signals from an optical distance detector. By such distance control, dot diameter does not fluctuate due to floating of the printing medium or the vibration given to the printing apparatus, and good printing can be performed.

Ink jet head 22 may comprise a single channel head, multi-channel heads, or full line heads, and sub-scanning is performed by the conveyance of the printing medium. When the ink jet head comprises multi-channel heads having a plurality of ink jet parts, the ink jet parts are arranged almost in parallel with the conveyance direction of the printing medium. Further, when the ink jet head comprises a single channel head or multi-channel heads, image data operation-controlling unit 21 moves ink jet head 22 in orthogonal direction to the conveyance direction of the printing medium, and an oily ink is ejected on the basis of the ejection position and the dot area rate obtained by the above image data operation. Thus, a dot image is imaged on the printing medium with the oily ink in accordance with the variable density of the printing original. This operation continues until a predetermined ink image is formed on the printing medium. On the other hand, when ink jet head 22 comprises full line heads having a length substantially the same with the width of the drum, the ink jet part is arranged in almost orthogonal direction to the conveyance direction of the printing medium, and an oily ink image is formed on the printing medium by passing of the printing medium through the imaging part. The printing medium thus printed is subjected to fixation by fixing member 5, and discharged by the automatic discharger.

Constitutional examples of the printing apparatus for performing single-sided four-color printing have been shown but the present invention is not limited thereto, and number of colors and single-sided/double-sided printing can be arbitrarily selected according to necessity.

Ink jet imaging unit 3 is then explained in detail with referring to FIG. 9.

As shown in FIG. 9, ink jet imaging unit 3 comprises ink jet recording unit 20 and equipped with ink jet head 22, ink-feeding part 24, head distancing/approximating unit 31, and head sub-scanning member 32.

Ink-feeding part 24 comprises ink tank 25, ink-feeding unit 26, and ink concentration-controlling member 29. Stirring unit 27 and ink temperature-controlling member 28 are provided in the ink tank.

Inks may be circulated in the head and in this case the ink-feeding unit has also a recovery/circulation function. Stirring unit 27 controls the precipitation and agglomeration of the solid content of the inks. The stirring member is selected from rotary blades, ultrasonic vibrator, and a circulating pump, and these members may be used alone or in combination. Ink temperature-controlling member 28 is arranged so that a high quality image can be formed stably without causing the fluctuation of physical properties of the inks due to the ambient temperature fluctuation which leads to the dot diameter fluctuation. As the ink temperature-controlling member, well-known means can be used such as a method of arranging a heater, an exothermic element such as Peltier element, or a cooling element in the tank with the stirring member to make the temperature in the tank constant, and controlling the temperature with a temperature sensor, e.g., a thermostat. The temperature in the tank is preferably from 15° C. to 60° C., more preferably from 20° C. to 50° C. The stirring member for maintaining the temperature distribution in the tank constant and stirring unit 27 which controls the precipitation and agglomeration of the solid content of the ink may be used in common. Further, the imaging/printing apparatus in this embodiment is equipped with ink concentration-controlling member 29 for the purpose of performing high quality imaging. The control of ink concentration is performed by optical detection, the measurement of electrical conductance, the measurement of physical properties such as the measurement of viscosity, or the number of imaging sheets. When ink concentration is controlled by the measurement of physical properties, an optical detector, an electrical conductance-measuring apparatus, and a viscosity-measuring apparatus are provided in the ink tank or the inflow channel of ink alone or in combination and the control is performed by the output signals thereof. When ink concentration is controlled by the number of imaging sheets, feeding from a concentration ink tank for replenishing or an ink carrier tank for dilution which is not indicated to the ink tank by the number of copies and frequency is controlled.

As described above, image data operation-controlling unit 21 takes in timing pulses from the operation of the input image data, and encoder 30 provided in head distancing/approximating unit 31, the counter drum or capstan rollers and drives the head in accordance with the timing pulse. Further, when imaging is performed by the ink jet recording unit, the imaging drum is driven with a highly accurate driving member. Specifically, for example, there is a method of driving the imaging drum by decelerating the output from a highly accurate motor by highly accurate gears or steel belts, etc. Higher quality imaging can be effected by using these means alone or two or more in combination.

The ink jet head will be explained with referring to FIGS. 10 to 16. However, the present invention is not limited thereto.

Figure 10:
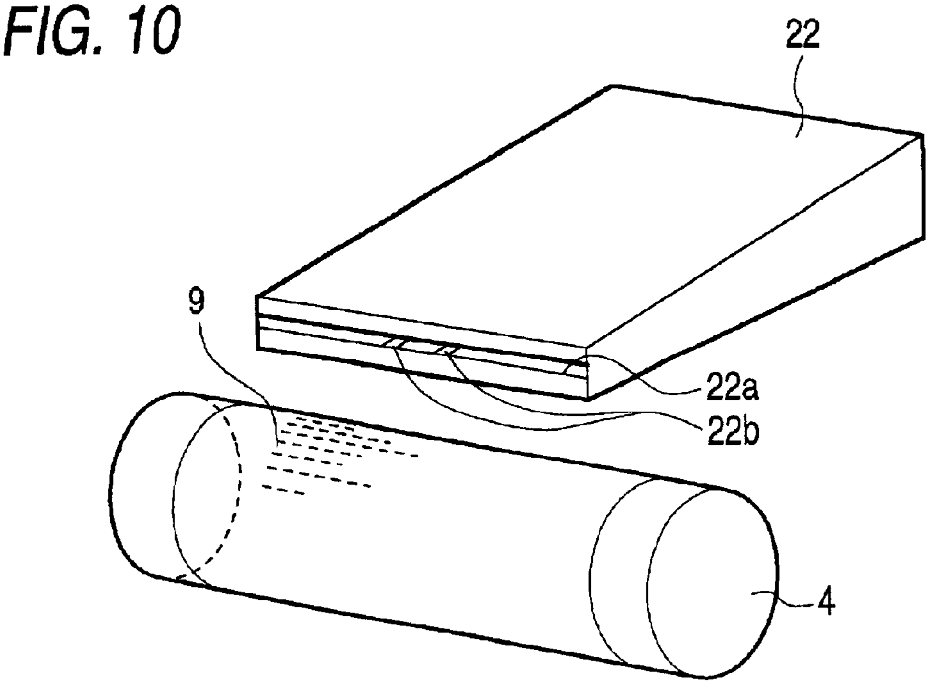
FIG. 10 is a diagram for explaining the ink jet recording unit mounted on the imaging unit shown in FIG. 9.
Figure 11:
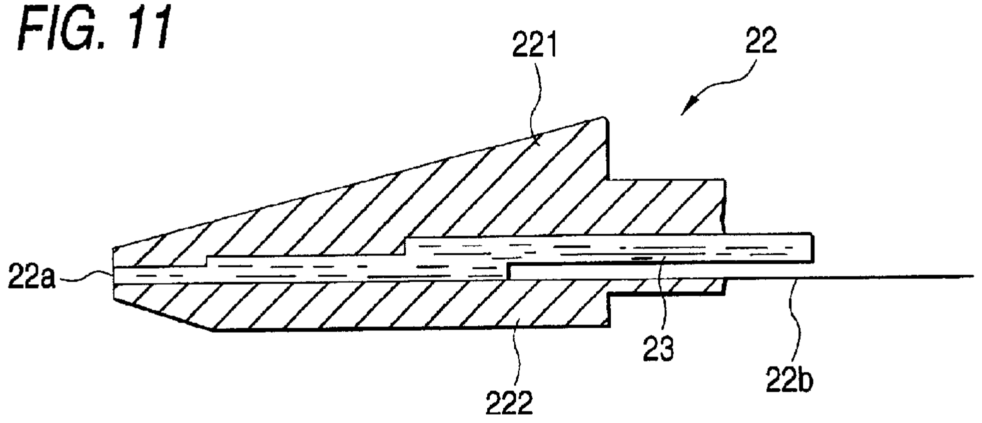
FIG. 11 is a diagram showing an enlarged cross section of the ink jet recording unit shown in FIG. 10.

FIG. 10 and FIG. 11 are examples of heads provided in the ink jet recording unit. Ink jet head 22 has a slit sandwiched in between upper unit 221 and lower unit 222 each comprising an insulating base material and the tip of ink jet head 22 forms jet slit 22*a*, ink jet electrode 22*b* is arranged in the slit, and the slit is filled with oily ink 23 fed from the ink-feeding unit. As the insulating base materials, e.g., plastics, glass, ceramics, etc., can be used. Ink jet electrode 22*b* is formed by well-known methods such as a method comprises steps of vacuum depositing, sputtering or electroless-plating an electrically conductive material such as aluminum, nickel, chromium, gold or platinum on lower unit 222 comprising an insulating base material, coating a photoresist thereon, exposing the photoresist via a mask of prescribed electrode pattern, developing the exposed photoresist to thereby form a photoresist pattern of ink jet electrode 22*b*, and etching the photoresist pattern, a method of mechanical removal, or a method of combining these methods.

In ink jet head 22, voltage is applied to ink jet electrode 22*b* in accordance with the digital signals of pattern data of the image. As shown in FIG. 10, an imaging drum is arranged in opposition to ink jet electrode 22*b* as the counter electrode, and a printing medium is mounted on the imaging drum. On the impression of voltage, a circuit is formed between ink jet electrode 22*b* and the imaging drum of counter electrode, oily ink 23 is ejected from jet slit 22*a* of ink jet head 22 and an image is formed on the printing medium on the imaging drum of counter electrode.

The width of the tip of ink jet electrode 22*b* is preferably narrow as much as possible for performing high quality imaging. The specific numeric value differs according to the conditions such as the impressed voltage and the physical properties of the ink but the tip width is generally from 5 to 100 μm.

For instance, when ink jet electrode 22*b* having a tip width of 20 μm is used with the distance between ink jet electrode 22*b* and imaging drum of counter electrode being 1.0 mm, a dot having a diameter of 40 μm can be formed on the printing medium by the impression of the voltage of 3 KV for 0.1 msec between the electrodes.

Figure 12:
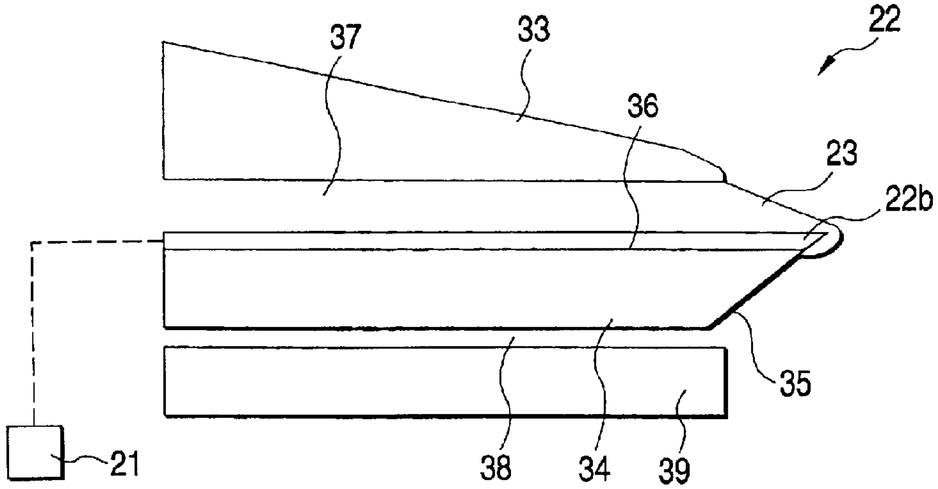
FIG. 12 is a schematic diagram showing a cross section at a vicinity of the ink jet part of another example of the ink jet head.
Figure 13:
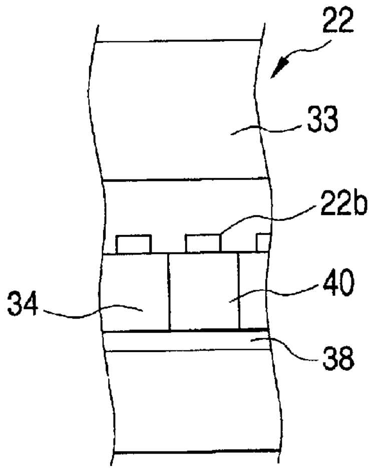
FIG. 13 is a schematic diagram showing the front view of the vicinity of the ink jet part of another example of the ink jet head.

FIGS. 12 and 13 are the cross-sectional schematic diagram and the front schematic diagram of the vicinity of the ink jet part of the example of other ink jet head respectively. In the figures, symbol 22 is an ink jet head, and ink jet head 22 has first insulating base material 33 of a tapering shape. Second insulating base material 34 is provided in opposition to first insulating base material 33 with a clearance therebetween, and beveled part 35 is formed at the tip of second insulating base material 34. First and second insulating base materials 33 and 34 are formed, e.g., of plastics, glass, ceramics, etc. On upper surface part 36 forming an acute angle with beveled part 35 of second insulating base material 34 are provided a plurality of ink jet electrode 22*b* as the electrostatic field-forming member for forming an electrostatic field at the ink jet part. The tips of these plurality of ink jet electrode 22*b* extend to the vicinity of the tip of upper surface part 36 and the tips thereof form ink jet parts with protruding farther than first insulating base material 33. Inflow channel of ink 37 is formed between first and second insulating base materials 33 and 34 as the member of supplying oily ink 23 to the above-described ink jet parts, and recovering channel of ink 38 is formed under the lower side of second insulating base material 34. Ink jet electrode 22*b* are formed on second insulating base material 34 with an electrically conductive material such as aluminum, nickel, chromium, gold, or platinum according to well-known methods in the same manner as above. Each ink jet electrode 22*b* is constituted so that electrically insulating from each other. The length of the tip of ink jet electrode 22*b* protruding farther than the tip of first insulating base material 33 is preferably 2 mm or less. The reason the protruding length is restricted in the above range is that if the protruding length is too long, the ink meniscus does not reach the tip of the ink jet part, and the ink is difficult to be ejected or the recording frequency decreases. Further, the clearance between first insulating base material 33 and second insulating base material 34 is preferably from 0.1 to 3 mm. The reason the clearance is restricted in the above range is that if the clearance is too narrow, ink-feeding is difficult, as a result the ink is difficult to be ejected or the recording frequency decreases, while if it is too broad, the meniscus does not stabilize and the ejection becomes unstable. Ink jet electrode 22*b* is connected with image data operation-controlling unit 21, the ink on the ink jet electrode is ejected on the basis of the image data by impressing voltage on the ink jet electrode when performing recording, and imaging is performed on the printing medium which is not shown in the figure arranged in opposition to the ink jet part. The direction opposite to the ink droplet jet direction of inflow channel of ink 37 is connected with the ink-feeding member of the ink-feeding unit not shown in the figure. Backing 39 is provided on the counter side to the surface of second insulating base material 34 opposite to the surface on which the ink jet electrodes are formed with a clearance therebetween which forms recovering channel of ink 38. The clearance of recovering channel of ink 38 is preferably 0.1 mm or more. The reason the clearance is restricted in the above range is that if the clearance is too narrow, the recovery of ink is difficult, as a result, ink leakage is caused. Recovering channel of ink 38 is connected with the ink recovering member of an ink-feeding unit which is not shown in the figure. When uniform ink flow is required on the ink jet part, grooves 40 may be provided between the ink jet part and the recovering channel of ink. FIG. 13 is the front schematic diagram of the vicinity of the ink jet part of the ink jet head. A plurality of grooves 40 are provided on the bevel of second insulating base material 34 from the vicinity of the boundary with ink jet electrode 22*b* toward recovering channel of ink 38. Grooves 40 are arranged side by side in plurality in the direction of the array of ink jet electrode 22*b*, and they have the function of introducing a definite amount of the ink in the vicinity of the tip of the ink jet electrode by a capillary force in accordance with the aperture diameter from the aperture on the side of ink jet electrode 22*b* and discharging the introduced ink to recovering channel of ink 38. Therefore, grooves 40 have the function of forming an ink flow having a definite liquid thickness in the vicinity of the tip of the ink jet electrode The shape of grooves 40 may be any shape so long as capillary force can function, but particularly preferably they have a width of from 10 to 200 μm and a depth of from 10 to 300 μm. A necessary number of grooves 40 are provided so as to be capable of forming uniform ink flows on the entire surface of the head.

The width of the tip of ink jet electrode 22*b* is preferably narrow as much as possible for performing high quality imaging. The specific numeric value differs according to the impressed voltage and the physical properties but the tip width is generally from 5 to 100 μm.

Figure 14:
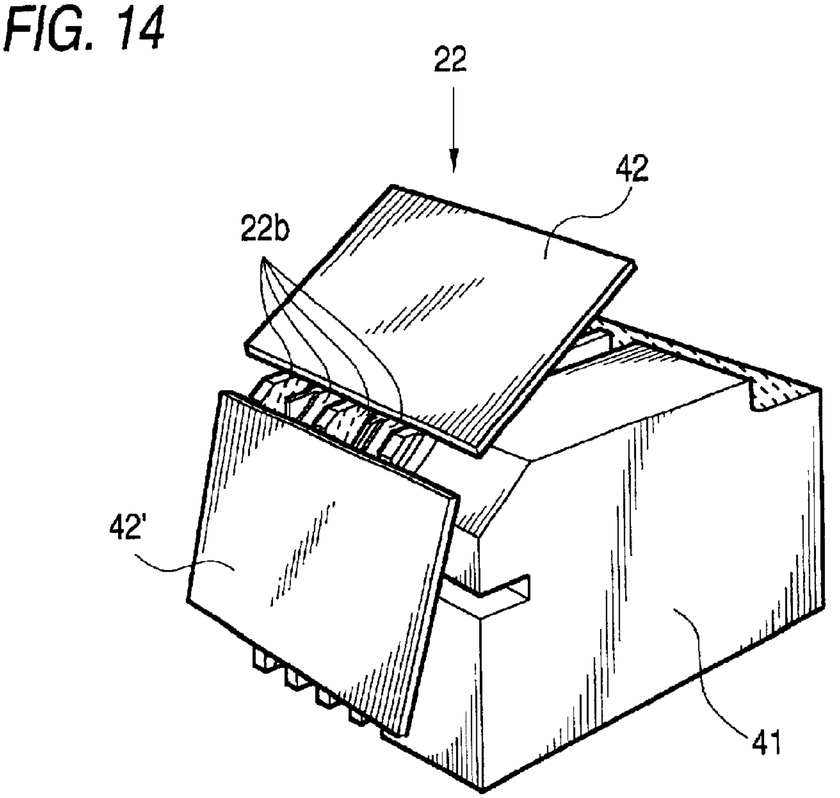
FIG. 14 is a schematic diagram partially showing another example of the ink jet head.
Figure 15:
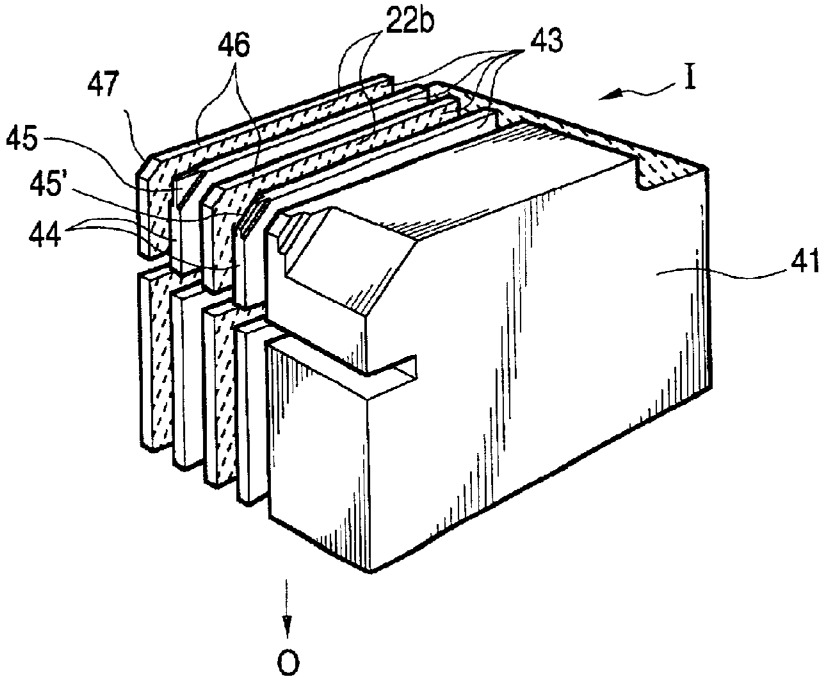
FIG. 15 is a schematic diagram showing the ink jet head shown in FIG. 14 from which meniscus regulating boards 42 and 42' are excluded.

Other examples of the ink jet heads for use in the execution of the present invention are shown in FIGS. 14 and 15. FIG. 14 is a schematic diagram showing only one part of the head for explanation. As shown in FIG. 14, ink jet head 22 comprises head body 41 made of an insulating material such as plastics, ceramics or glass and meniscus regulating boards 42 and 42'. In FIG. 14, symbol 22*b* are the ink jet electrodes for performing voltage impression to form an electrostatic field at the ink jet part. The head body is described in detail below with referring to FIG. 15, wherein meniscus regulating boards 42 and 42' are excluded from the head. Head body 41 is equipped with a plurality of ink slots 43 for circulating an ink vertically to the edge of the head body. The shape of ink slot 43 may be any shape so long as capillary force can function so as to form uniform ink flow, but particularly preferably it has a width of from 10 to 200 μm and a depth of from 10 to 300 μm. Ink jet electrodes 22*b* are provided in ink slots 43. Ink jet electrodes 22*b* are formed on head body 41 made of an insulating material with an electrically conductive material such as aluminum, nickel, chromium, gold, or platinum according to well-known methods in the same manner as above. Ink jet electrodes 22*b* may be formed on the entire surface in ink slot 43, or may be arranged locally. Each ink jet electrode is electrically isolated from other ink jet electrodes. Adjacent two ink slots form one cell and ink jet parts 45 and 45' are provided at the front of bulkhead 44 positioned at the center of two ink slots. Bulkhead 44 at ink jet parts 45 and 45' is thinner than other part of bulkhead 44, i.e., tapered. The head body is produced by known methods, such as machining, etching or molding of insulating material blocks. The thickness of the bulkhead at the ink jet part is preferably from 5 to 100 μm, and the radius of curvature of the tapered front is preferably from 5 to 50 μm. The ink jet part may be slightly chamfered such as ink jet part 45'. Although only two cells are shown in FIG. 15, a cell is partitioned by bulkhead 46 and front of bulkhead 47 is chamfered so as to be recessed from ink jet parts 45 and 45'. Ink is flowed through the ink slot from the direction I by the ink-feeding member of the ink-feeding unit which is not shown in FIG. 15 to feed the ink to the ink jet part. The surplus ink is recovered by an ink recovering member not shown in FIG. 15 in the direction O, as a result, fresh ink is supplied to the ink jet part any time. In this state of the head body, by impressing voltage on the ink jet electrode on the basis of the image data to the imaging (counter) drum (not shown in FIG. 15), on the surface of which a printing medium is mounted, arranged in opposition to the ink jet part, the ink is ejected from the ink jet parts, and an image is formed on the printing medium.

Figure 16:
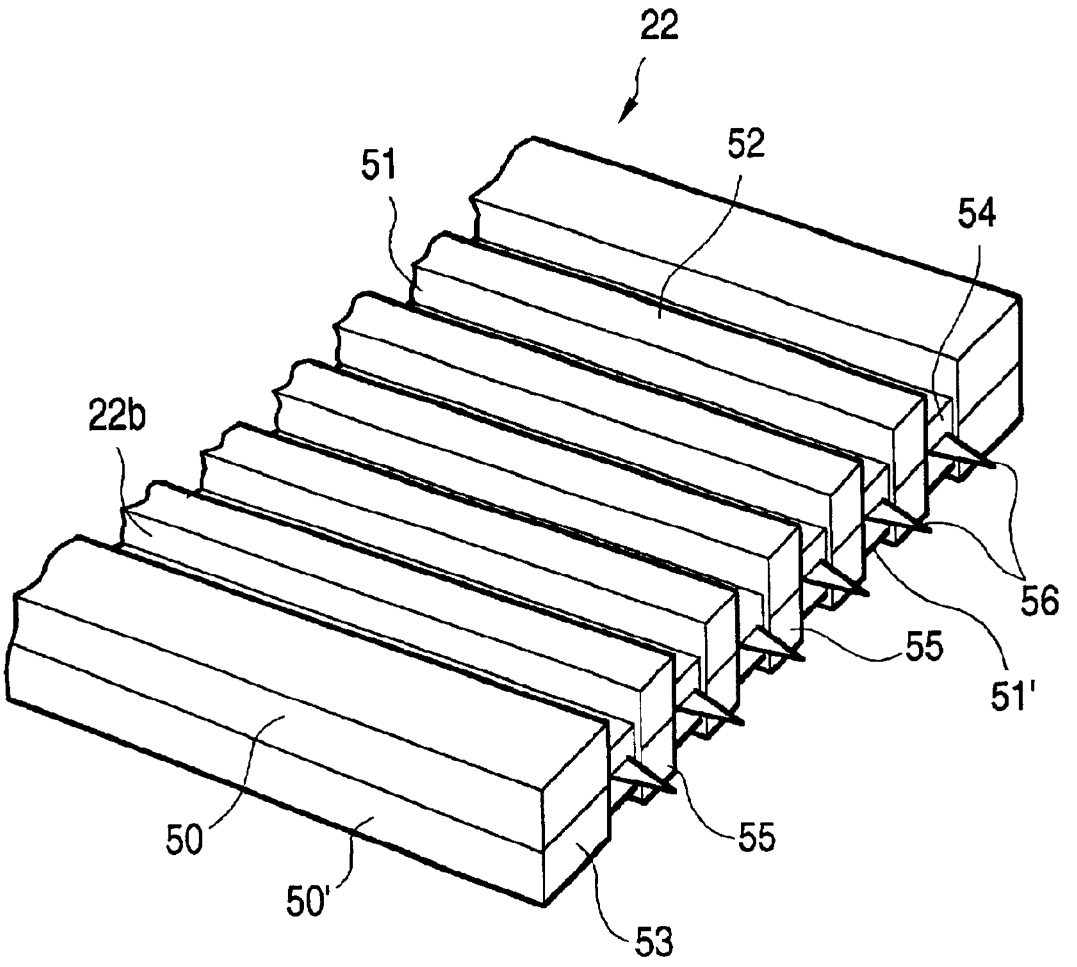
FIG. 16 is a schematic diagram partially showing an ink jet head using four 100 dpi 256 channel multi-channel heads.

Other example of the ink jet head for use in the execution of the present invention will be explained with referring to FIG. 16. As shown in FIG. 16, ink jet head 22 has a pair of almost rectangular support members 50 and 50'. These support members 50 and 50' are formed of an insulating plate-like plastics, glass or ceramics having a thickness of from 1 to 10 mm, and a plurality of rectangular chamfers 51 and 51' extending in parallel to each other in accordance with recording resolution are formed on one surface of each support member. Chamfers 51 and 51' each preferably-has a width of from 10 to 200 μm and a depth of from 10 to 300 μm, and ink jet electrodes 22*b* are formed on the inside of the chamfer entirely or partly. A plurality of rectangular bulkheads 52 are necessarily provided between each chamfer 51 by forming a plurality of chamfers 51 and 51' on the entire surface of support members 50 and 50'. Support members 50 and 50' are combined so that the surfaces on which chamfers 51 and 51' are not formed are opposed. That is, ink jet head 22 has a plurality of ink slots for circulating an ink on the peripheral. Chamfers 51 and 51' formed on support members 50 and 50' are linked via rectangular part 54 of ink jet head 22 in proportion of 1 to 1, and rectangular part 54 in which each chamfer is linked is recessed from upper end 53 of ink jet head 22 by a definite distance (from 50 to 500 μm). That is, upper end 55 of each bulkhead 52 of support members 50 and 50' is provided on both sides of each rectangular part 54 so as to protrude from rectangular part 54, and guide protrusion 56 comprising an insulating material protruding from each rectangular part 54 forms the ink jet part. When the ink is circulated in the thus-constituted ink jet head 22, the ink is supplied to each rectangular part 54 via each chamfer 51 formed on the periphery of support member 50, and the ink is discharged via each chamfer 51' formed on the periphery of another support member 50'. In this case, for circulating the ink smoothly, ink jet head 22 slants at a definite angle. That is, ink jet head 22 slants so that the ink supplying side (support member 50) is positioned upper and the ink discharging side (support member 50') is positioned lower. When the ink is circulated in ink jet head 22 in such a way, the ink passing through rectangular part 54 wets upward along each guide protrusion 56, thus an ink meniscus is formed in the vicinity of guide protrusion 56 of rectangular part 54. In the state wherein an independent ink meniscus is formed at rectangular part 54, by impressing voltage on ink jet electrode 22*b* on the basis of the image data to the imaging drum (not shown in FIG. 16), on the surface of which a printing medium is mounted, arranged in opposition to the ink jet part, the ink is ejected from the ink jet parts, and an image is formed on the printing medium. Further, a cover may be provided on the periphery of support members 50 and 50' for covering the chamfers to form a pipe-like channel of ink and the ink may be circulated forcedly by this ink channel. In this case, it is not necessary to slant ink jet head 22.

Ink jet heads 22 shown in FIGS. 10 to 16 may contain apparatus for maintenance, e.g., a head cleaning member, if necessary. For example, when a suspension period continues or anything unusual has arisen with image quality, good imaging quality can be maintained by using the means of rubbing ink jet head tips with a soft brush and cloth, circulating only an ink solvent, or sucking the ink jet parts with feeding or circulating only an ink solvent, alone or in combination. Further, for preventing inks from fixing, it is preferred that the ink jet head is put in a cover filled with the vapor of an ink solvent or the head is cooled to inhibit the vaporization of an ink solvent. When staining is heavy, it is also effective to forcedly suck the ink from the ink jet part, forcedly introduce air, ink or the jet of an ink solvent from the channel of ink, or apply ultrasonic wave with immersing the head in an ink solvent, and these methods may be used alone or in combination.

The first preferred embodiment is described in more detail below.

The first preferred embodiment of the present invention has a feature that cleaning of an ink jet head is performed in the ink jet method of ejecting an oily ink by means of an electrostatic field on a printing medium which is fed to a printing apparatus.

The printing apparatuses shown in FIGS. 17 to 24 are each equipped with head cleaning member 60 according to the present invention, which is described below. Cleaning of an ink jet head is performed by immersing the ink jet head in a cleaning solution and applying voltage to the ink jet head.

Figure 25:
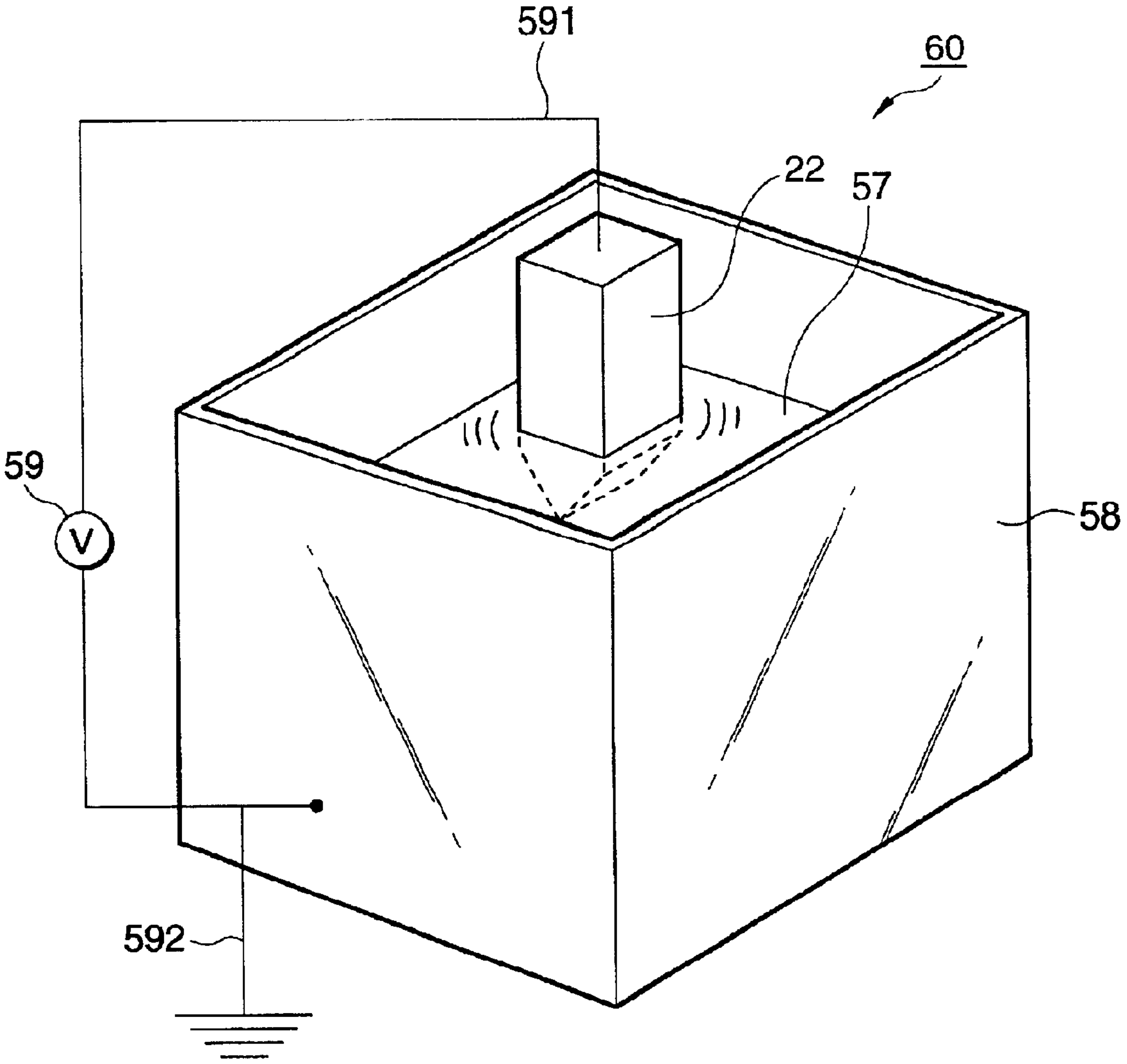
FIG. 25 is a diagram for explaining the ink jet head-cleaning member according to the present invention.
Figure 26:
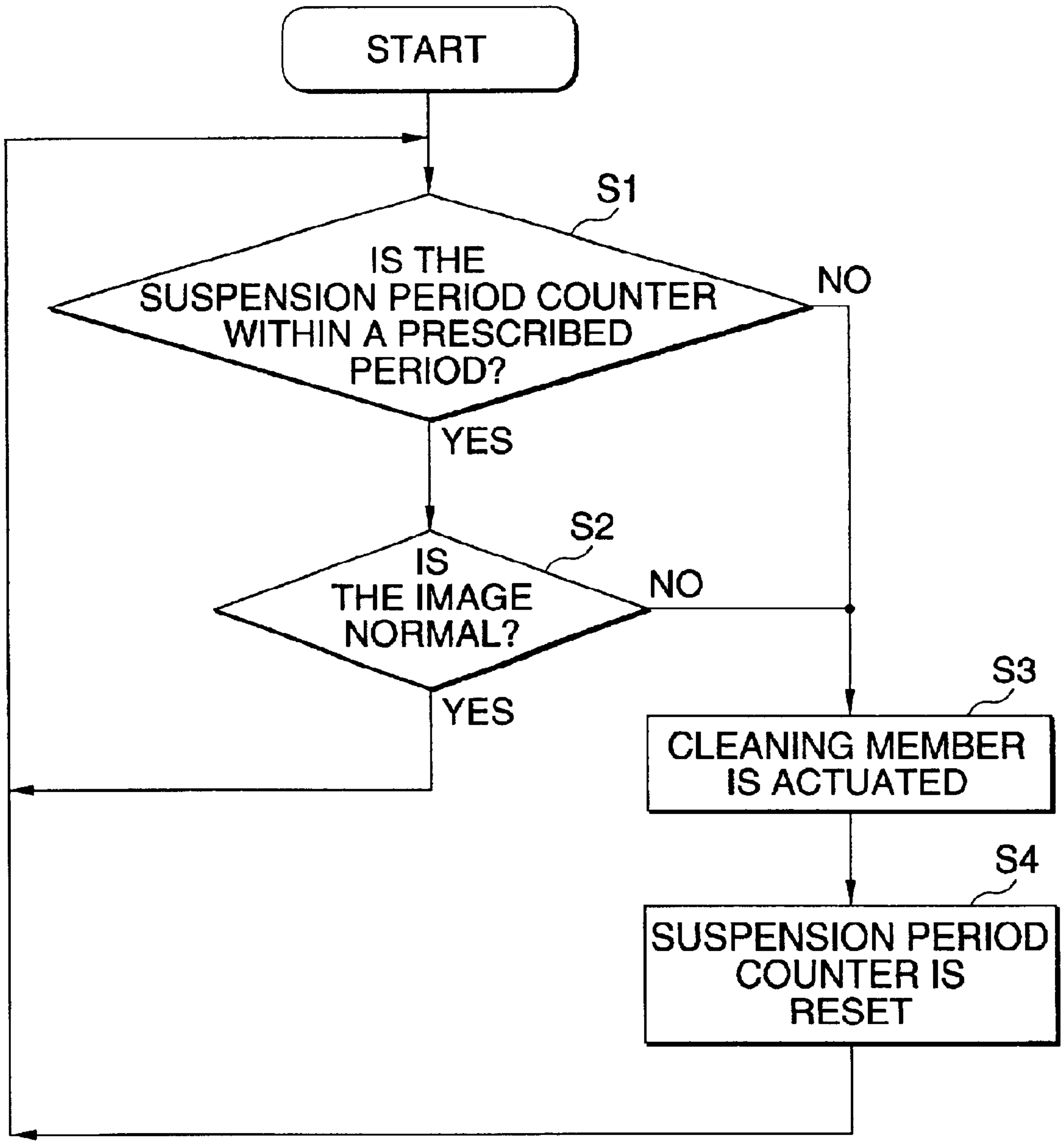
FIG. 26 is a flow chart for explaining the action of the ink jet head-cleaning member shown in FIG. 25.

FIG. 25 is a diagram explaining the ink jet head cleaning member according to the present invention. FIG. 26 is a flow chart for explaining the action of the ink jet head cleaning member shown in FIG. 25.

In the first preferred embodiment, ink jet heads 22 as shown in FIGS. 10 to 16 are each subjected to cleaning for maintaining good imaging condition. For example, when a suspension period continues or anything unusual has arisen with image quality, good imaging quality can be maintained by using the means of rubbing ink jet head tips with a soft brush and cloth, circulating only an ink solvent, or sucking the ink jet parts with feeding or circulating only an ink solvent, alone or in combination. Further, for preventing inks from fixing, it is preferred that the ink jet head is put in a cover filled with the vapor of an ink solvent or the head is cooled to inhibit the vaporization of an ink solvent. When staining is heavy, it is also effective to forcedly suck the ink from the ink jet part, forcedly introduce air, ink or the jet of an ink solvent from the channel of ink, or apply ultrasonic wave with immersing the head in an ink solvent, and these methods may be used alone or in combination.

However, when the cleaning member described below are used, the ink jet head can be maintained more simply and more clearly than the time of using the above means.

The cleaning member according to the present invention will be described with referring to FIG. 25.

The cleaning member is shown by symbol 60 in FIG. 25. In cleaning member 60, ink jet head 22 is conveyed to cleaning member 60 by a conveyor not shown in the figure, at least the tip of the ink jet part of ink jet head 22 is immersed in cleaning solution 57, the voltage of the same polarity with the polarity of the solid charged components in the ink is applied to the ink jet electrode of ink jet head 22 from electric source 59 via lead wire 591, and other lead wire 592 of electric source 59 is connected to the metal chassis of cleaning solution container 58. By the connection, the solid charged components are repelled by the ink jet electrode and tenaciously removed.

In this case, the impressed voltage may be alternating voltage, or alternating voltage may be applied on the voltage of the same polarity with the polarity of the solid charged components. In particular, when alternating voltage is applied on the voltage of the same polarity with the polarity of the solid charged components, the solid charged components begin to vibrate to increase cleaning effect.

Further cleaning effect is further enhanced by the application of ultrasonic wave together with the voltage impression. Any cleaning solutions can be used so long as they do not affect the ink jet head. Alcohols, ink solvents and the ink itself are preferably used as such a cleaning solution.

FIG. 26 is a flow chart for explaining the action of the cleaning member of an ink jet head shown in FIG. 25. Cleaning member 60 is actuated when the suspension period of a printing apparatus continues for a long period of time or when anything unusual has arisen with images or image quality. A suspension period counter which counts the suspension period of a printing apparatus (not shown in FIG. 26) counts up the suspension period of a printing apparatus, and when the suspension period exceeds a prescribed period (e.g., one month) (step 1), cleaning member 60 is actuated (step 3).

In addition, an image and image quality are always inspected with, e.g., a CCD camera, and the image quality is compared with the standard image in memory in CPU. If any problem is found in the image and image quality as the result of the comparison (step 2), cleaning member 60 is actuated even if the suspension period of the printing apparatus is within the prescribed period (step 3).

When cleaning member 60 is actuated, cleaning is performed by immersing at least the tip of the ink jet part of ink jet head 22 in cleaning solution 57 as shown in FIG. 25.

After cleaning has been finished, the suspension period counter which counts the suspension period of the printing apparatus is reset to start counting of the suspension period of the printing apparatus.

Next, the second preferred embodiment of the present invention is described in more detail below.

The second preferred embodiment of the present invention has a feature that either or both of stopping the image formation and eliminating a cause of the malfunction is performed, when a malfunction happens in the ink jet printing method, which comprises directly forming an image on a printing medium on the basis of signals of image data and fixing the image to produce a printed matter, wherein said image formation is carried out by an ink jet system of ejecting an oily ink by an electrostatic field.

The printing apparatuses shown in FIGS. 27 to 35 are each equipped with head protecting member 201. Although only one head protecting member 201 is shown in these figures for avoiding complexity, head protecting member 201 may provided one to every one ink jet imaging unit 3, and their installation positions can be appropriately selected.

Figure 36:
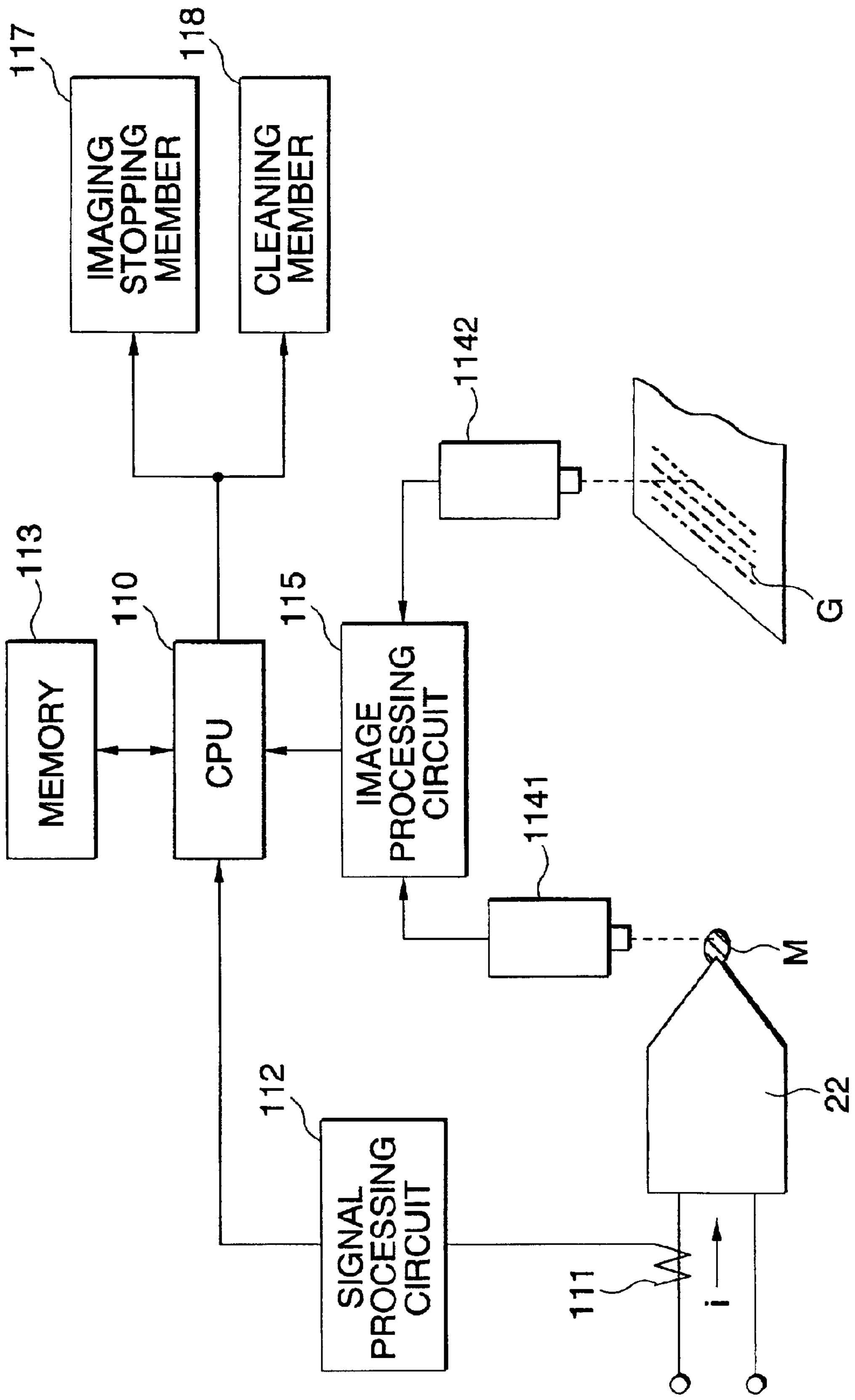
FIG. 36 is a diagram showing an example of the method of detecting an abnormal electric current to the ink jet head, an image quality defect and an abnormal contour of meniscus.
Figure 37:
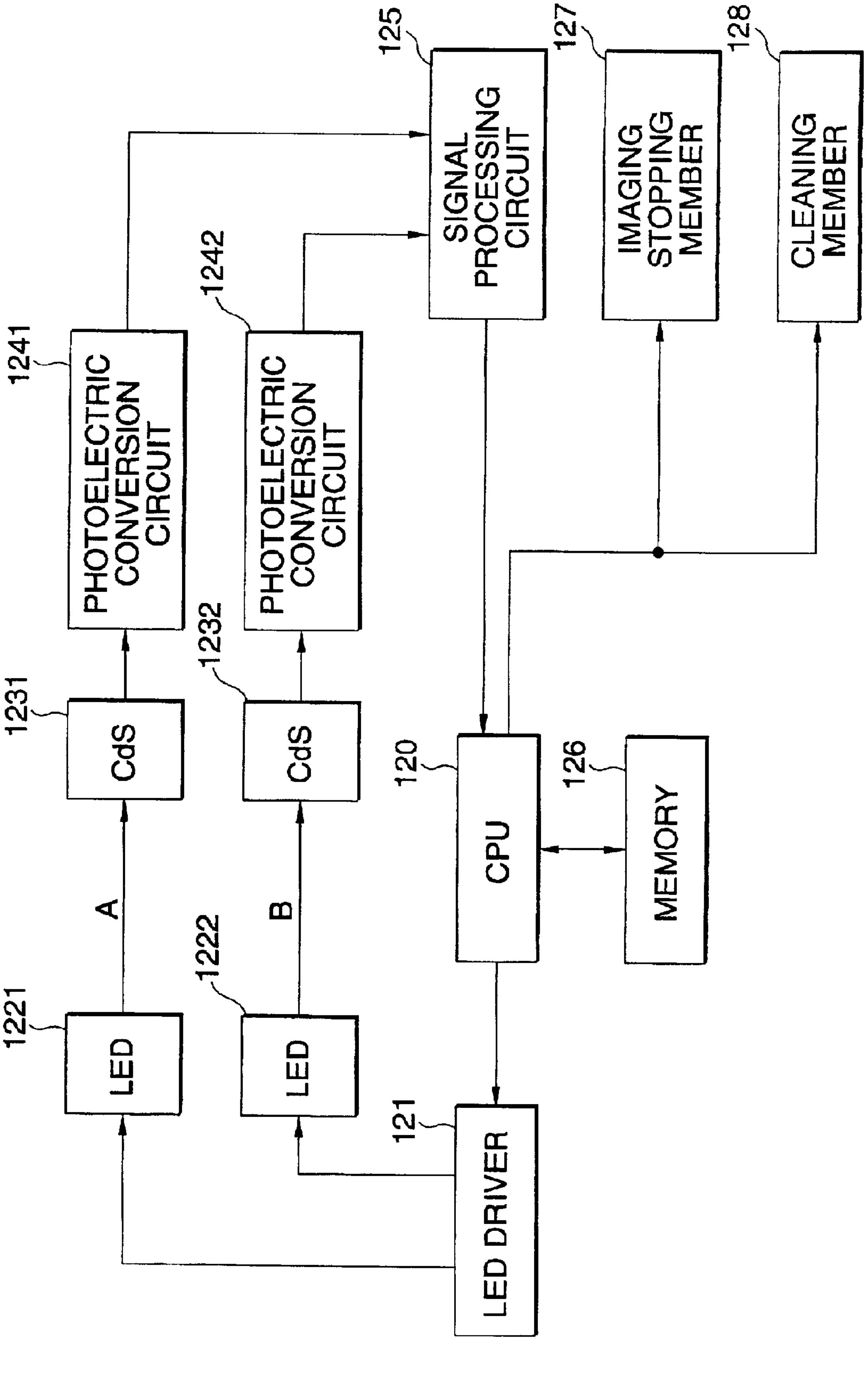
FIG. 37 is a diagram showing an example of a dust-detecting member by optical detection.

FIG. 36 is a diagram showing an example of the method of detecting an abnormal electric current of the ink jet head, an image defect and an abnormal contour of meniscus, for use in this preferred embodiment. FIG. 37 is also a diagram showing an example of a dust-detecting member by optical detection.

Head protecting member 201 for use in this preferred embodiment includes a malfunction detecting member, a malfunctioning cause eliminating member, an imaging stopping member at the time when a malfunction happens, and a foreign matter adhesion-preventing member.

Figure 35:
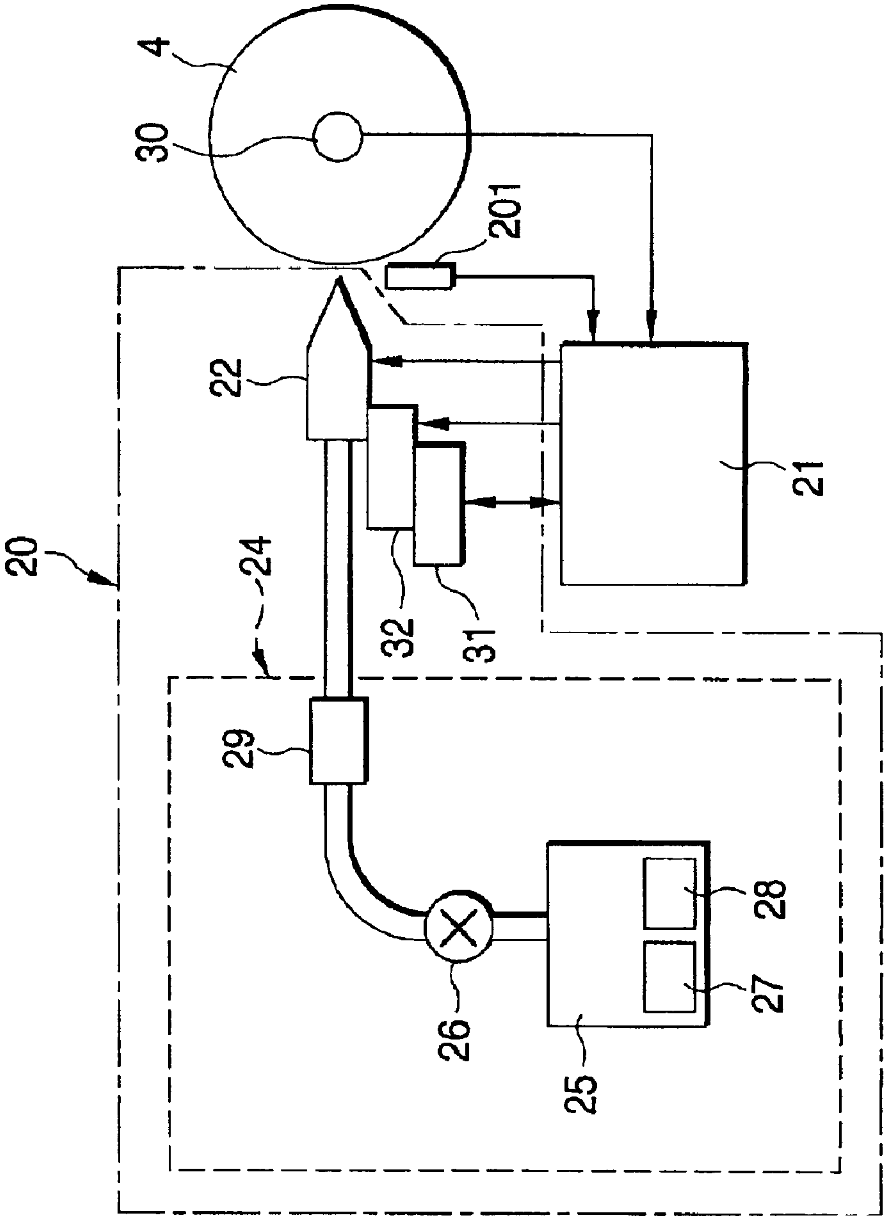
FIG. 35 is a schematic diagram of an imaging unit of the ink jet printing apparatus according to the present invention, including a controlling part, an ink-feeding part, and a head distancing/approximating mechanism.

As shown in FIG. 35, ink jet imaging unit 3 comprises ink jet recording unit 20 and equipped with ink jet head 22, ink-feeding part 24, head distancing/approximating unit 31, and head sub-scanning member 32, and head protecting member 201 and image data operation-controlling unit 21 are arranged in the close vicinity.

Head protecting member 201 includes (1) a member of preventing adhesion of foreign matters to the head and (2) a member of stopping imaging at generation of a malfunction, in addition to the malfunction detecting member and malfunctioning cause eliminating member described below.

Figure 31:
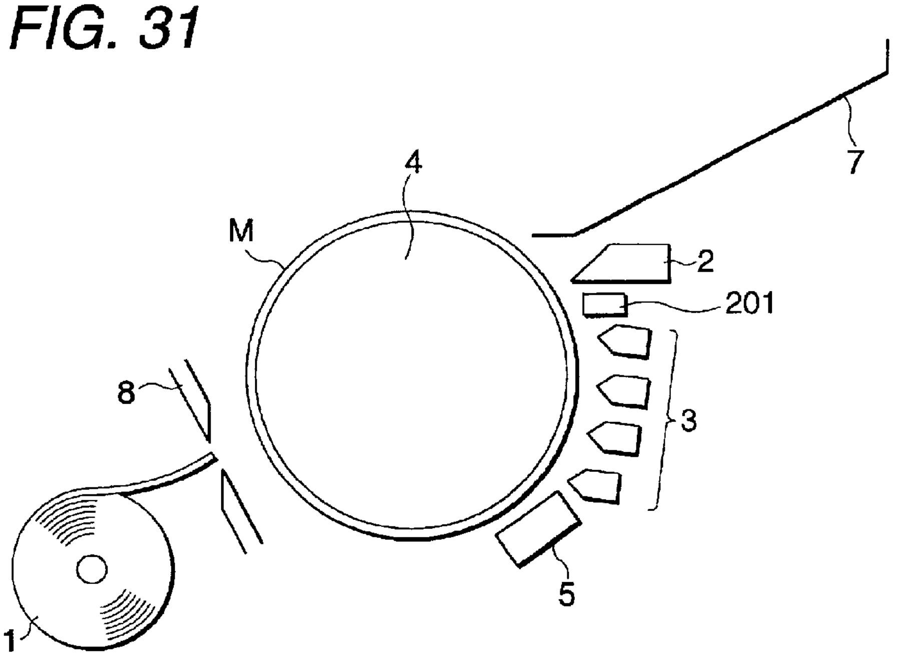
FIG. 31 is a schematic diagram showing the constitution of a single-sided four-color printing apparatus according to another example of the ink jet printing apparatus of the present invention, which performs printing by cutting a rolled printing medium and winding the cut printing medium round the counter drum.
Figure 32:
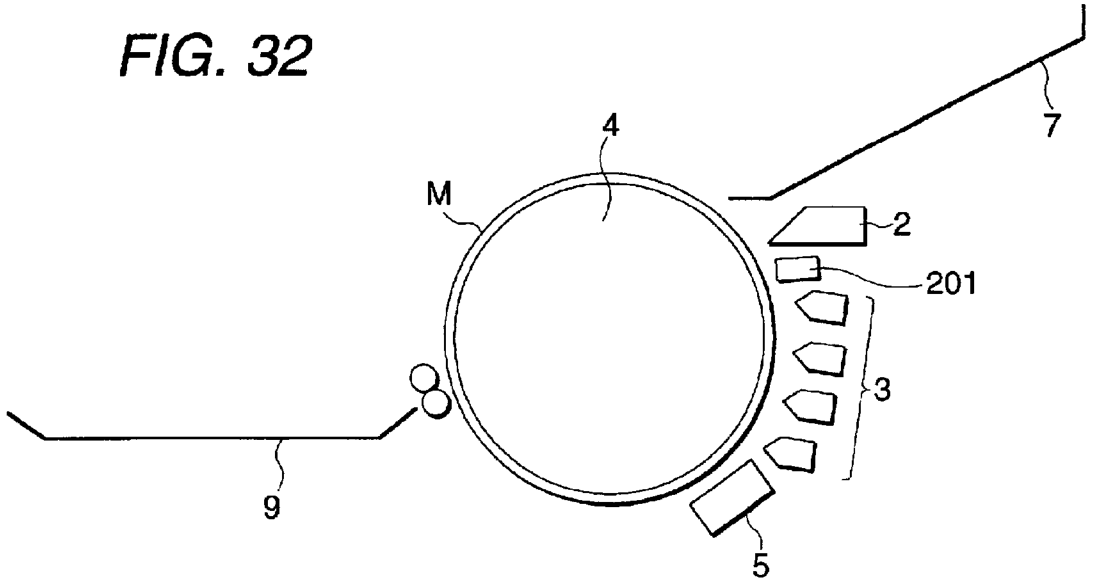
FIG. 32 is a schematic diagram showing the constitution of a printing apparatus of another example according to the ink jet printing apparatus of the present invention, which uses a sheet state recording medium.

(1) As the foreign matter adhesion preventing member, e.g., a head-protecting cover can be cited. That is, the adhesion of foreign matters can be prevented by putting the head in a cover when imaging is not performed. FIG. 31 shows an example of such a cover for use in this embodiment. Ink jet head 22 is put in cover 51 with shutter 52 as shown in FIG. 31, and shutter 52 is opened and ink jet head 22 is advanced toward imaging position when imaging is performed. Inks or ink solvents can be filled in cover 51. By filling cover 51 with inks or ink solvents, the trouble due to adhesion of inks to ink jet head 22 can be prevented from occurring even when imaging is not performed for a long period of time.

(2) As the imaging stopping member at the time of malfunction, there can be exemplified, e.g., a dust-detecting unit (described below), or a mechanism which comprises a member of detecting an abnormal electric current to the ink jet head (described below), connected with image data operation-controlling unit 21, and which stops the voltage signal to the head 22 when abnormal signal is sent from the unit. The damage of the head can be prevented thereby.

Various detecting apparatuses of the present invention for detecting adhesion of foreign matters to the head, dusts and vibration are described below. These detecting apparatuses are used for detecting the adhesion of foreign matters to the head, dusts and vibration, and with respect to the detection of the adhesion of foreign matters to the head, these apparatus perform the detection of the abnormal electric current of the ink jet head, image quality defects, and the abnormal contour of meniscus, by which the imaging stopping member and/or the cleaning member (described later) are actuated.

As the member for detecting the abnormal electric current of the ink jet head, image quality defects, and the abnormal contour of meniscus, one example is shown in FIG. 36. That is, when dusts are adhered to the head, discharge time becomes short or short circuit occurs and extraordinary large electric current comes to flow to the head as compared with the ordinary electric current. For detecting such abnormal electric current to the head, electric current i flowing to the head is detected by electric current detecting circuit 111, electric signal is converted to digital signal in signal processing circuit 112, and the digital signal is sent to CPU 110. CPU 110 compares the received digital signal with the standard value in memory 113, and if the result of the comparison is out of tolerance, imaging stopping member 117 and/or cleaning member 118 are actuated.

As member for detecting the abnormal contour of meniscus, e.g., the contour of meniscus M formed by ink jet head 22 and a printing ink by a capillary phenomenon is photographed with CCD camera 1141 installed in the vicinity of the head, the photographed image is processed in image processing circuit 115 and CPU 110 to automatically measure the contour of meniscus M, and CPU 110 compares this contour with the standard contour of meniscus M in memory 113. CCD camera 1141 depicts a normal meniscus contour if foreign matters are not adhered to ink jet head 22, but if foreign matters are adhered to ink jet head 22, CCD camera 1141 depicts a distorted contour. If the distorted contour is out of tolerance as the result of comparison by CPU 110, CPU 110 actuates imaging stopping member 117 and/or cleaning member 118.

The detecting method of the image quality defect is substantially the same with the detecting method of the abnormal contour of meniscus. That is, image G formed is photographed with CCD camera 1142 installed in the vicinity of the image, the photographed image is converted to digital signal in image processing circuit 115, and the digital signal is sent to CPU 110. CPU 110 compares the received digital signal with the standard data of images in memory 113, and if the result of the comparison is out of tolerance, CPU 110 actuates imaging stopping member 117 and/or cleaning member 118.

It is also preferred to actuate this cleaning member when the suspension of the printing apparatus has continued for a long period of time.

The dust detecting member detects the dusts adhered on a printing medium or floating in apparatus. As the detecting member, various means are used such as optical detection or weight detection of filtered dusts. Optical detection is preferred.

FIG. 37 is a diagram showing one example of detecting member by an optical detection process.

Some pairs of luminescence elements and light receptor elements 1221–1231, 1222–1232 are arranged at printing medium (A) whose dusts are to be detected and at place (B) in apparatus where dusts are liable to float. Luminescence elements 1221 and 1222 are LED and connected to LED driver 121, and LED driver 121 makes luminescence elements 1221 and 1222 emit in accordance with the control from CPU 120. On the other hand, light receptor elements 1231 and 1232 are photo-transistors and connected to photoelectric conversion circuits 1241 and 1242 respectively. When these light receptor elements 1231 and 1232 receive luminescence from luminescence elements 1221 and 1222, light signal is converted to electric signal at photoelectric conversion circuits 1241 and 1242, and outputted to signal processing circuit 125. Signal processing circuit 125 converts electric signal from the first and second light receptor elements 1231 and 1232 to digital signal and the digital signal is sent to CPU 120. CPU 120 compares the received digital signals with the standard value in memory 126, and if the result of the comparison is out of tolerance, CPU 120 actuates imaging stopping member 127 and/or cleaning member 128.

Further, concerning the vibration detecting member, e.g., individual or relative vibrations (the amount of displacement and the frequency of vibration) of printing apparatus body and/or heads and/or drums are detected with a self-mixture type laser Doppler unit (e.g., JP-A-10-9943), and imaging is hung up or/and stopped. At that time, only the imaging signal concerning the head is hung up or/and the movement of drumhead is hung up.

The printing media for use in the present invention will be described below.

As the printing media, high quality paper, slightly coated paper and coated paper which are generally used can be exemplified. Paper having a resin film layer on the surface, e.g., polyolefin laminated paper, and plastic films, e.g., a polyester film, a polystyrene film, a vinyl chloride film, and a polyolefin film, can also be used. Further, plastic films deposited with metals on the surface or laminated with metal foils, and processed paper can also be used. Special paper for ink jet printing and special film can of course be used.

The oily inks for use in the present invention are described below.

The oily inks for use in the present invention are dispersions of at least colored particles dispersed in a nonaqueous solvent having an intrinsic electrical resistance of $10^9$ Ω·cm or more and a dielectric constant of 3.5 or less.

As the nonaqueous solvent having an intrinsic electrical resistance of $10^9$ Ω·cm or more and a dielectric constant of 3.5 or less for use in the present invention, straight chain or branched aliphatic hydrocarbon, alicyclic hydrocarbon, aromatic hydrocarbon, and the substitution products of these hydrocarbons substituted with halogen are exemplified as preferred examples. Specific examples include, e.g., hexane, heptane, octane, isooctane, decane, isodecane, decalin, nonane, dodecane, isododecane, cyclohexane, cyclooctane, cyclodecane, benzene, toluene, xylene, mesitylene, Isopar C, Isopar E, Isopar G, Isopar H, and Isopar L (Isopar: trade name of the products manufactured by Exon Co., Ltd.), Shell Sol 70 and Shell Sol 71 (Shell Sol: trade name of the products manufactured by Shell Oil Co., Ltd.), Amsco OMS and Amsco 460 solvents (Amsco: trade name of the products manufactured by Spirits Co., Ltd.), silicone oils, etc., and they are used alone or in combination. Further, the upper limit of the intrinsic electrical resistance of these nonaqueous solvents is about $10^{16}$ Ω·cm and the lower limit of the dielectric constant is about 1.9.

The reason the electrical resistance of the non-aqueous solvent to be used is restricted in the above range is that if the electrical resistance is low, the concentration of colored particles are difficult to occur and the dot image formed becomes light in color or blurring may occur, and the reason the dielectric constant is restricted in the above range is that if the dielectric constant is high, the electric field relaxes due to the polarization of a solvent, as a result, ink jetting is liable not to be performed smoothly.

As the colored particles dispersed in the above-described nonaqueous solvent, coloring materials themselves may be dispersed in a nonaqueous solvent as the dispersion particles, or the colored particles may be contained in resin particles for dispersion for the purpose of improving fixing property. When the colored particles are contained in resin particles for dispersion, pigments are generally covered with the resin materials of the resin particles for dispersion to make resin-covered particles, and dyes are generally used as colored particles by coloring resin particles for dispersion.

As such coloring materials, any of pigments and dyes which have so far been used as oily ink components or used in liquid developers for electrostatic photographs can be used in the present invention.

As the pigments for use in the present invention, inorganic and organic pigments generally used in the technical field of printing can be used. Specifically, well-known pigments, e.g., carbon black, cadmium red, molybdenum red, chromium yellow, cadmium yellow, titanium yellow, chromium oxide, viridian, cobalt green, ultramarine blue, Prussian blue, cobalt blue, azo series pigments, phthalocyanine series pigments, quinacridone series pigments, isoindolinone series pigments, dioxazine series pigments, indanthrene series pigments, perylene series pigments, perinone series pigments, thioindigo series pigments, quinophthalone series pigments, and metal complex pigments can be used without no particular restriction.

As the dyes for use in the present invention, oil-soluble dyes, e.g., azo dyes, metal complex salt dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, and metallic phthalocyanine dyes can be preferably used.

These pigments and dyes may be used alone or in arbitrary combination, and the use amount is preferably from 0.5 to 5 wt % based on the entire weight of the ink.

It is preferred that resin particles for dispersion are contained with the above-described colored particles in the oily ink for use in the present invention for the purpose of improving the fixing property of the image after printing.

The resin particles dispersed in the above nonaqueous solvent may be sufficient if they are hydrophobic particles which are solid at temperature lower than 35° C. and have the affinity with the nonaqueous solvent, but the resins (P) preferably have a glass transition point of from −5° C. to 110° C. or a softening point of from 33° C. to 140° C., more preferably a glass transition point of from 10° C. to 100° C. or a softening point of from 38° C. to 120° C., and still more preferably a glass transition point of from 15° C. to 80° C. or a softening point of from 38° C. to 100° C.

With the use of resins having such a glass transition point or a softening point, the affinity of the surface of the printing medium with the resin particles increases, and the linkage of the resin particles to each other on the printing medium is strengthened, thus the adhesion of images to the surface of the printing medium is improved and the scratch resistance is improved. Contrary to this, when the glass transition point or the softening point is out of the above range, either higher or lower, the affinity of the surface of the printing medium with the resin particles lowers or the linkage of the resin particles to each other is liable to decrease.

The resin (P) has a weight average molecular weight (Mw) of from $1\times10^3$ to $1\times10^6$, preferably from $5\times10^3$ to $8\times10^5$, and more preferably from $1\times10^4$ to $5\times10^5$.

Various resins can be exemplified as the resin (P), and the specific examples of the resins (P) include olefin homopolymers and copolymers (e.g., polyethylene, polypropylene, polyisobutylene, ethylene-vinyl acetate copolymer, ethylene-acrylate copolymer, ethylene-methacrylate copolymer, ethylene-methacrylic acid copolymer, etc.), vinyl chloride homopolymers and copolymers (e.g., polyvinyl chloride, vinyl chloride-vinyl acetate copolymer, etc.), vinylidene chloride copolymers, vinyl alcanate homopolymers and copolymers, allyl alcanate homopolymers and copolymers, homopolymers and copolymers of styrene and derivatives thereof (e.g., butadiene-styrene copolymer, isoprene-styrene copolymer, styrene-methacrylate copolymer, styrene-acrylate copolymer, etc.), acrylonitrile copolymers, methacrylonitrile copolymers, alkyl-vinyl ether copolymers, acrylate homopolymers and copolymers, methacrylate homopolymers and copolymers, itaconic acid diester homopolymers and copolymers, maleic anhydride copolymers, acrylamide copolymers, methacrylamide copolymers, phenolic resins, alkyd resins, polycarbonate resins, ketone resins, polyester resins, silicon resins, amide resins, hydroxyl group-modified and carboxyl group-modified polyester resins, butyral resins, polyvinyl acetal resins, urethane resins, rosin resins, hydrogenated rosin resins, petroleum resins, hydrogenated petroleum resins, maleic resins, terpene resins, hydrogenated terpene resins, coumarone-indene resins, cyclized rubber-methacrylate copolymers, cyclized rubber-acrylate copolymers, copolymers containing a heterocyclic ring not containing a nitrogen atom (examples of the heterocyclic rings include, e.g., a furan ring, a tetrahydrofuran ring, a thiophene ring, a dioxane ring, a dioxofuran ring, a lactone ring, a benzofuran ring, a benzothiophene ring, a 1,3-dioxetane ring, etc.), and epoxy resins.

The total content of the colored particles and the resin particles dispersed in the oily ink according to the present invention is preferably from 0.5 to 20 wt % of the entire content of the ink. When the content is too small, problems are liable to be caused such that the printed image density becomes insufficient or the affinity of the surface of the printing medium with the ink decreases, and reliable images cannot be obtained. On the other hand, when the content of the colored particles and the resin particles is too large, a homogeneous dispersion solution cannot be obtained, ink flow at the ink jet head is liable to lack uniformity and stable ink jetting cannot be ensured.

The colored particles dispersed in the nonaqueous solvent according to the present invention inclusive of the resin particles preferably have an average particle diameter of from 0.05 to 5 μm, more preferably from 0.1 to 1.5 μm, and still more preferably from 0.4 to 1.0 μm. This particle diameter was obtained by CAPA-500 (trade name, manufactured by Horiba Seisakusho Co., Ltd.).

The colored particles to be dispersed in a nonaqueous solvent for use in the present invention can be prepared by conventionally well-known mechanical pulverizing methods or polymerization granulation methods. As the mechanical pulverizing method, a method wherein a coloring material and a resin are mixed, melted, kneaded and directly pulverized by any of well-known pulverizers, according to necessity, and the resulting fine particles are further dispersed together with a dispersion polymer by a wet disperser (e.g., a ball mill, a paint shaker, a KD mill, a Dyno mill, etc.), and a method of kneading a coloring material which is a component of colored particles and a dispersion assisting polymer (or a covered polymer) in advance, pulverizing the obtained mixture and then dispersing the pulverized particles with a dispersion polymer can be exemplified. Specifically, producing methods of paints and liquid developers for electrostatic photographs can be employed and these methods are described, e.g., in Kenji Ueki supervised, *Toryo no Ryudo to Ganryo Bunsan* (*Fluidity of Paints and Dispersion of Pigments*), Kyoritsu Shuppan Co. (1971), Solomon, *Paint and Surface Coating Theory and Practice*, Hirokawa Shoten Co. (1969), Yuji Harasaki, *Coating Kogaku* (*Coating Engineering*), Asakura Shoten Co. (1971), and Yuji Harasaki, *Coating no Kiso Kagaku* (*Fundamental Science of Coating*), Maki Shoten Co. (1977).

Further, there is a method of manufacturing colored particles by coloring the resin particles granulated by a polymerization granulation method by dyeing. As the polymerization granulation method, conventionally well-known nonaqueous dispersion polymerization methods can be exemplified, and these methods are specifically described, e.g., in Soichi Muroi supervised, *Cho-Biryushi Polymer no Saishin Gijutsu* (*The Latest Technology of Ultra-Fine Particle Polymer*, Chap. 2, CMC Publishing Co. (1991), Koichi Nakamura compiled, *Saikin no Denshishashin Genzo System to Toner Zairyo no Kaihatsu to Jitsuyoka* (*Recent Development Systems in Electrophotography and Development and Practical Uses of Toner Materials*, Chap. 3, Nihon Kagaku Joho Co. (1985), and K. E. J. Barrett *Dispersion Polymerization in Organic Media*, John Wiley (1975).

In general, for stabilizing dispersion particles in a nonaqueous solvent, a dispersion polymer is used in combination. A dispersion polymer contains a repeating unit soluble in a nonaqueous solvent as a main component and has a weight average molecular weight (Mw) of preferably from $1\times10^3$ to $1\times10^6$, more preferably from $5\times10^3$ to $5\times10^5$.

A polymer component represented by the following formula (I) can be exemplified as the preferred soluble repeating unit of a dispersion polymer for use in the present invention:

(I)

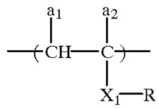

wherein $X_1$ represents —COO—, —OCO— or —O—.

R represents an alkyl or alkenyl group having from 10 to 32 carbon atoms, preferably an alkyl or alkenyl group having from 10 to 22 carbon atoms, which may be a straight chain or branched, and preferably unsubstituted but may be substituted.

Specific examples of the alkyl and alkenyl groups represented by R include a decyl group, a dodecyl group, a tridecyl group, a tetradecyl group, a hexadecyl group, an octadecyl group, an eicosanyl group, a docosanyl group, a decenyl group, a dodecenyl group, a tridecenyl group, a hexadecenyl group, an octadecenyl group, and a linolenyl group.

$a_1$ and $a_2$, which may be the same or different, each represents a hydrogen atom, a halogen atom (e.g., chlorine, bromine), a cyano group, an alkyl group having from 1 to 3 carbon atoms (e.g., methyl, ethyl, propyl), —COO-$Z_1$ or —$CH_2$COO-$Z_1$ ($Z_1$ represents a substituted or unsubstituted hydrocarbon group having 22 or less carbon atoms (e.g., an alkyl group, an alkenyl group, an aralkyl group, an alicyclic group, an aryl group, etc.)).

$Z_1$ specifically represents a hydrocarbon group, and as preferred hydrocarbon groups, an alkyl group having from 1 to 22 carbon atoms which may be substituted (e.g., methyl, ethyl, propyl, butyl, hexyl, heptyl, octyl, nonyl, decyl, dodecyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethyl, 3-bromopropyl), an alkenyl group having from 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl, linolenyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, methoxybenzyl), an alicyclic group having from 5 to 8 carbon atoms which may be substituted (e.g., cyclohexyl, 2-cyclohexylethyl, 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, dodecyloylamidophenyl) can be exemplified.

The dispersion polymer may contain, with the repeating unit represented by formula (I), other repeating units as copolymer components. Any compounds may be used as the other repeating units so long as they comprise monomers which are copolymerizable with a monomer corresponding to the repeating unit represented by formula (I).

The ratio of the polymer component represented by formula (I) in the dispersion polymer is preferably 50 wt % or more, more preferably 60 wt % or more.

As the specific example of the dispersion polymer, a resin for dispersion stabilization (Q-1) used in the examples shown below can be exemplified, and commercially available products can also be used (e.g., Solprene 1205, manufactured by Asahi Chemical Industry Co., Ltd.).

The dispersion polymer is preferably added in advance to the particles of the above resin (P) for the polymerization for producing a dispersion (latex).

The addition amount of the dispersion polymer is preferably from 1 to 50 wt % or so based on the weight of the particles of the resin (P).

The colored particles (or coloring material particles) and the resin particles for dispersion in the oily ink of the present invention are preferably electroscopic particles having plus charge or minus charge.

For imparting electroscopicity to these particles, the techniques of the liquid developers for electrostatic photographs can be employed. Specifically, these techniques can be performed by using the electroscopic materials and other additives described in the above *Saikin no Denshishashin Genzo System to Toner Zairyo no Kaihatsu to Jitsuyoka* (*Recent Development Systems in Electrophotography and Development and Practical Uses of Toner Materials*, pp. 139 to 148, Denshishashin Gakkai compiled, *Denshishashin Gijutsu no Kiso to Oyo* (*The Fundamentals and Applications of Electrophotographic Techniques*), pp. 497 to 505, Corona Co., Ltd. (1988), and Yuji Harasaki, *Denshishashin* (*Electrophotography*), 16, No. 2, p. 44 (1977).

Specific techniques are disclosed, e.g., in British Patents 893,429, 934,038 and 1,122,397, U.S. Pat. Nos. 3,900,412 and 4,606,989, and JP-A-60-179751, JP-A-60-185963 and JP-A-2-13965.

The charging adjustors as described above are preferably added in an amount of from 0.001 to 1.0 weight part per 1,000 weight parts of a dispersion medium which is a liquid carrying the charging adjustors. Further, various additives may be added thereto, if necessary, and the upper limit of the total amount of these additives is restricted by the electrical resistance of the oily ink to be used. That is, when the intrinsic electrical resistance of the ink in the state exclusive of dispersion particles is lower than $10^9$ Ω·cm, an image of excellent continuous tone can be obtained with difficulty, hence it is desired to control the addition amount of each additive within the above range.

The present invention will be described in greater detail with reference to the following examples, but the present invention should not be construed as being limited thereto.

EXAMPLES

In the first place, a preparation example of resin particles for ink (PL-1) will be described.

Preparation Example 1

Preparation of Resin Particles (P-1)

A mixed solution containing 10 g of resin for dispersion stabilization (Q-1) having the structure shown below, 100 g of vinyl acetate and 384 g of Isopar H was heated to a temperature of 70° C. under nitrogen gas stream with stirring. As a polymerization initiator, 0.8 g of 2,2'-azobis (isovaleronitrile) (AIVN) was added thereto, and the mixture was allowed to react for 3 hours. Twenty minutes after the addition of the polymerization initiator, white turbidity was generated in the reaction mixture and the reaction temperature had risen to 88° C. Further, 0.5 g of the same initiator was added to the reaction solution and the reaction was continued for 2 hours, then the temperature was raised to 100° C., followed by stirring for 2 hours, then unreacted vinyl acetate was removed by distillation. After cooling, the reaction mixture was passed through a nylon cloth of 200 mesh. The resulting white dispersion was a highly monodispersed latex having a polymerization rate of 90% and an average particle diameter of 0.23 μm. The average particle diameter was measured by CAPA-500 (manufactured by Horiba Seisakusho Co., Ltd.).

Resin for Dispersion Stabilization (Q-1):

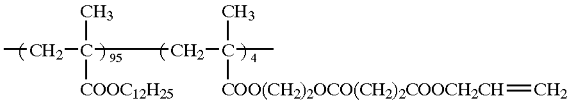

Mw: 5 x $10^4$ (weight ratio)

A part of the above white dispersion was centrifuged (rotation number: $1\times10^4$ rpm, rotation time: 60 minutes), and the precipitated resin particle content was collected and dried. The resin particle content had a weight average molecular weight (Mw: GPC value calculated in terms of polystyrene) of $2\times10^5$, and a glass transition point (Tg) of 38° C.

Example 1

In the first place, an oily ink was prepared.

Preparation of Oily Ink (IK-1):

Ten (10) grams of a dodecyl methacrylate/acrylic acid copolymer (copolymerization ratio: 95/5 by weight), 10 g of nigrosine, and 30 g of Shell Sol 71 were put in a paint shaker (manufactured by Toyo Seiki Co., Ltd.) together with glass beads, and the content of the shaker was dispersed for 4 hours, thus a fine particle dispersion of nigrosine was obtained.

Thirty (30) grams (as the weight of the solid content) of resin particles (PL-1) prepared in the above Preparation Example 1 of resin particles for oily ink, 20 g of the above nigrosine dispersion, 15 g of FOC-1400 (tetradecyl alcohol, manufactured by Nissan Chemical Industries, Ltd.), and 0.08 g of an octadecene-semi-maleic acid octadecylamide copolymer were diluted with 1 liter of Isopar G, thus black oily ink (IK-1) was obtained.

In the next place, the ink tank of the ink jet recording unit of the imaging unit of the printing apparatus shown in FIG. 1 was filled with 2 liters of the above-prepared oily ink IK-1. As the ink jet head, 900 dpi, full line heads of the type shown in FIG. 12 were used here. An immersion heater and rotary blades were provided in the ink tank as an ink temperature-controlling member, the ink temperature was set at 30° C., and the temperature was controlled by a thermostat with rotating the rotary blades at 30 rpm. The rotary blades were also functioned as a stirring member for preventing precipitation and agglomeration. The inflow channel of ink was made partly transparent, an LED luminescence element and a light-detecting element were arranged with the inflow channel of ink between, and the concentration of ink was controlled by putting an ink dilution solution (Isopar G) or a concentrated ink (the concentration of the solid content of the above ink IK-1 was adjusted to 2 times) into the ink tank according to the output signals. As the printing medium, rolled slightly coated paper was mounted on a counter drum and conveyed. After removing the dusts on the surface of the printing medium by suction with an air pump, an ink jet head was brought to close to the imaging position of the printing medium, the image data to be printed was transmitted to the image data operation-controlling unit, and an image was formed by ejecting the oily ink from the full line multi-channel heads with conveying the printing medium by the rotation of the counter drum. At this time, the tip width of the ink jet electrode of the ink jet head was 10 $\mu$m, and the distance between the head and the printing medium was maintained at 1 mm by the output by an optical gap detector. Voltage of 2.5 KV was always impressed as bias voltage for ejection, and 500 V of pulse voltage was further impressed on the bias voltage when ejection is performed. Imaging was performed with changing the dot area by varying the pulse voltage in 256 stages of from 0.2 msec to 0.05 msec. Imaging defect due to dusts was not observed at all, and image deterioration by the fluctuation of dot diameter due to the variation of the outer temperature and the increase of printing time was not observed at all, thus good printing was feasible.

The image formed was enhanced by heating by means of a xenon flash fixing member (manufactured by Ushio Electric Co., Ltd., emission strength: 200 J/pulse). After printing, the ink jet recording unit was recessed from the position in the vicinity of the imaging drum by 50 mm for the protection of the ink jet head.

The obtained printed matters showed markedly clear image with no skip and blur. Cleaning was performed for 10 minutes after printing by supplying Isopar G to the head and dripping Isopar G from the aperture of the head, and the head was put in a cover filled with the vapor of Isopar G. Good printed matters could be obtained with necessitating no maintenance work for three months.

Example 2

The printing apparatuses shown in FIGS. 2 and 3 were used, wherein a circulating pump was used as the stirring member (symbol 27 in FIG. 9), four 150 dpi 64 channel multi-channel heads shown in FIG. 12 were used, and the heads were arranged so that the ink jet parts for 64 channels were arrayed in the orthogonal direction to the axis of the drum.

As the oily inks, the following four kinds of inks were used, that is, black ink IK-1, cyan ink IK-2 which was prepared in the same manner as in the preparation of IK-1 except that nigrosine used as the coloring material of ink IK-1 was replaced with phthalocyanine blue, magenta ink IK-3 which was prepared in the same manner as in the preparation of IK-1 except that nigrosine used as the coloring material of ink IK-1 was replaced with C.I. pigment red 57:1, and yellow ink IK-4 which was prepared in the same manner as in the preparation of IK-1 except that nigrosine used as the coloring material of ink IK-1 was replaced with C.I. pigment yellow 14, and these inks were filled in four heads respectively.

A pump was used here. An ink reservoir was provided between the pump and the inflow channel of ink, and between the recovering channel of ink of the ink jet head and the ink tank, respectively, and the ink was circulated by the difference of hydrostatic pressures. As the ink temperature-controlling member, the above-described heater and the pump were used. The temperature of the ink was set at 35° C. and controlled by a thermostat. The circulation pump was also functioned as a stirring member for preventing precipitation and agglomeration.

Further, an electric conductance-measuring apparatus was provided in the inflow channel of ink, and the concentration of the ink was controlled by putting the ink dilution solution or the concentrated ink into the ink tank according to the output signals. After removing the dusts on the surface of the printing medium by a nylon rotary brush, the image data to be printed was transmitted to the image data operation-controlling unit, main scanning was performed by moving the head in the axis direction of the drum, and at the same time, sub-scanning was performed by rotating the imaging drum, and an image was formed by ejecting the ink on rolled slightly coated paper with imaging.

Imaging defect due to dusts was not observed at all, and image deterioration by the fluctuation of dot diameter due to the variation of the outer temperature and the increase of the number of printing sheets was not observed at all, and good single-sided and double-sided full color printing was feasible in either case of using the head shown in FIG. 12 or FIG. 14.

Cleaning was performed after printing by circulating Isopar G, and then bringing nonwoven fabric impregnated with Isopar G into contact with the tip of the head. Good printed matters could be obtained with necessitating no maintenance work for three months.

Example 3

Single-sided four-color full color printing was performed with the printing apparatus shown in FIG. 5. The inks of four colors used in Example 2 were used as the oily inks in four ink jet imaging unit respectively. Four 100 dpi 256 channel multi-channel heads shown in FIG. 16 were used, and ink jet parts were arranged in parallel to the axis of the counter drum. Main scanning was performed by rotating the counter drum, and an image of 900 dpi was formed on coated paper by moving the heads one after another in the axis direction of the counter drum every one revolution. Full color printed matters with sharp and high quality images could be obtained.

Example 4

Single-sided four-color full color printing was performed with the printing apparatuses shown in FIGS. 7 and 8. The same inks of four colors as used in Example 3 were used. As the ink jet heads, 600 dpi 64 channel multi-channel heads shown in FIG. 12 were used, and ink jet parts were arranged so as to form an angle of about 60° with the traveling direction of the printing medium. The image data to be printed was transmitted to the image data operation-controlling unit, and an image of 700 dpi was formed on ink jet special paper by conveying the printing medium by the rotation of the capstan rollers with moving 64 channel multi-channel heads in the orthogonal direction to the conveying direction of the printing medium. The same procedure as in Example 1 was repeated except for the above points, and four-color full color good printed matters were obtained.

Example 1A

Figure 17:
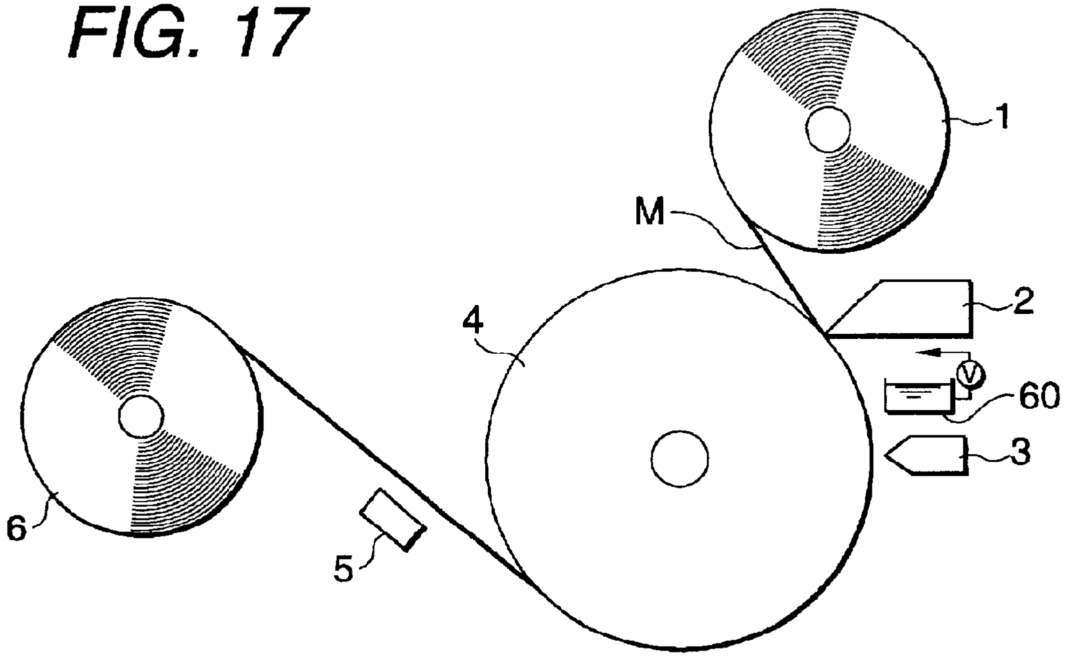
FIG. 17 is a schematic diagram showing the constitution of a web type printing apparatus for performing single-sided monochromatic printing, which is an example of the ink jet printing apparatus according to the present invention.

Image formation was carried out in the same manner as in Example 1 except for using the printing apparatus shown in FIG. 17 in place of the printing apparatus shown in FIG. 1. As a result, imaging defect due to dusts was not observed at all, and image deterioration by the fluctuation of dot diameter due to the variation of the outer temperature and the increase of printing time was not observed at all, thus good printing was feasible.

The image formed was enhanced by heating by means of a xenon flash fixing member (manufactured by Ushio Electric Co., Ltd., emission strength: 200 J/pulse). After printing, the ink jet recording unit was recessed from the position in the vicinity of the imaging drum by 50 mm for the protection of the ink jet head.

The obtained printed matters showed markedly clear image with no skip and blur. Cleaning was performed after printing by immersing the tips of the ink jet heads in Isopar G and impressing 1 kV of positive direct current voltage for 30 seconds. Good printed matters could be obtained with necessitating no maintenance work for three months.

Example 2A

Figure 18:
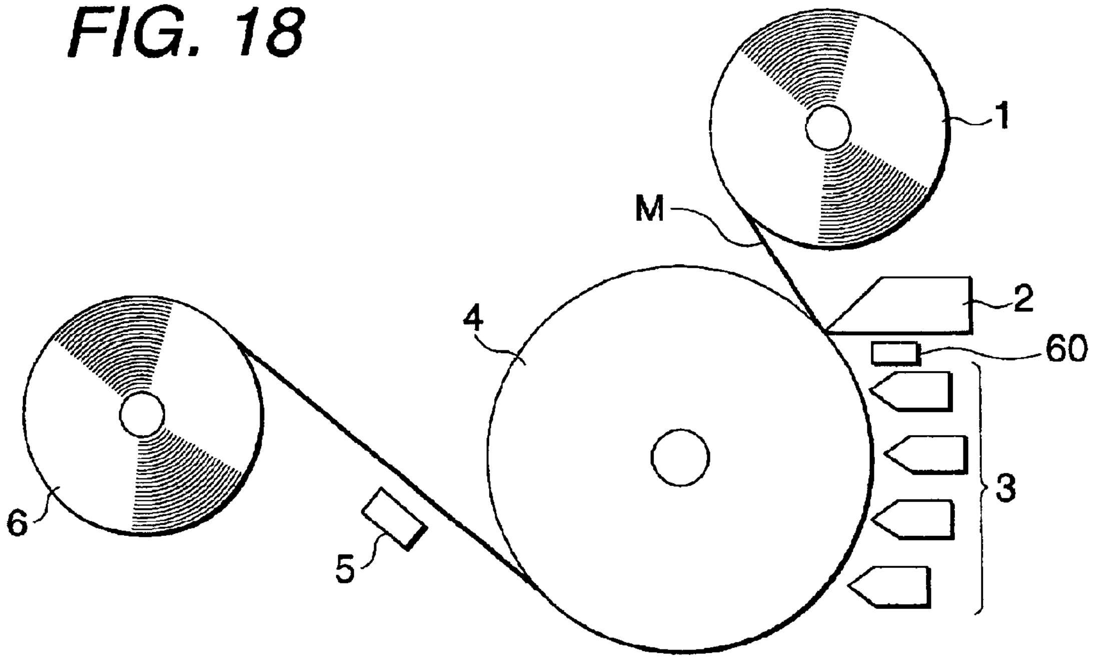
FIG. 18 is a schematic diagram showing the constitution of a web type printing apparatus for performing single-sided four-color printing, which is another example of the ink jet printing apparatus according to the present invention.
Figure 19:
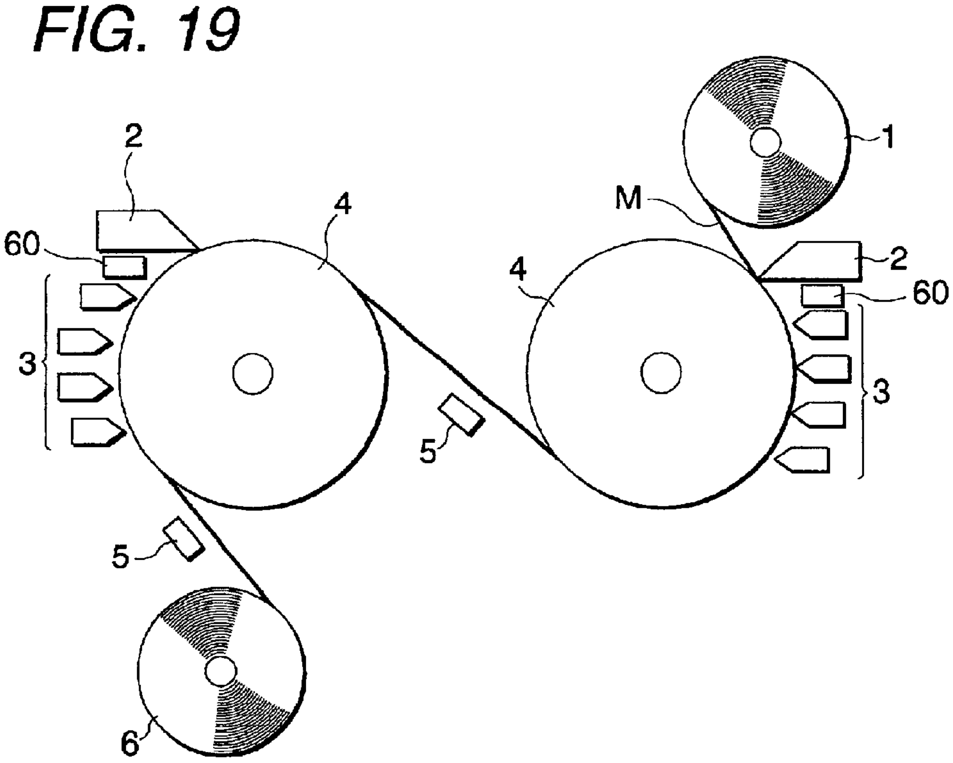
FIG. 19 is a schematic diagram showing the constitution of a double-sided four-color printing apparatus according to another example of the ink jet printing apparatus of the present invention.
Figure 20:
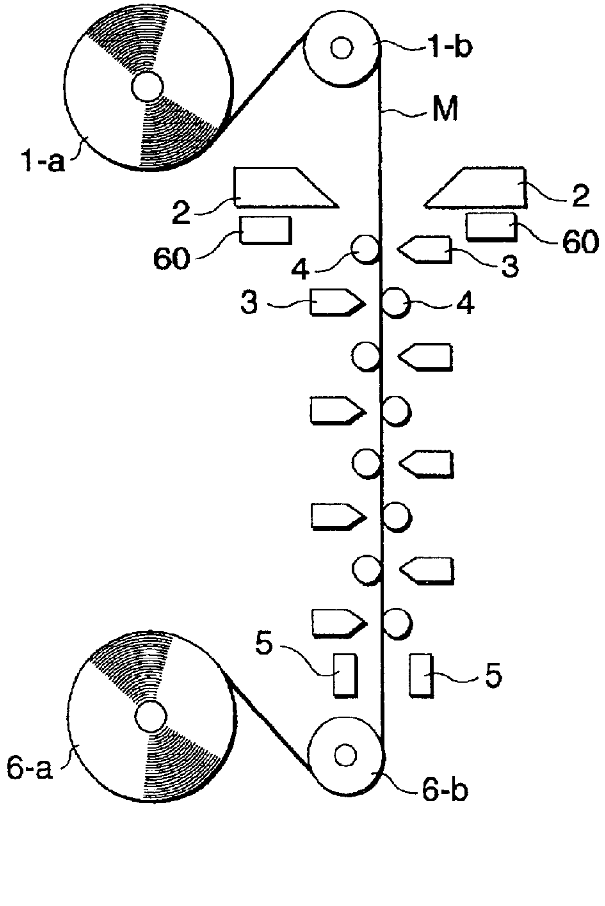
FIG. 20 is a schematic diagram showing the constitution of a double-sided four-color printing apparatus according to another example of the ink jet printing apparatus of the present invention.

Image formation was carried out in the same manner as in Example 2 except for using the printing apparatuses shown in FIGS. 18 and 19 in place of the printing apparatuses shown in FIGS. 2 and 3. As a result, imaging defect due to dusts was not observed at all, and image deterioration by the fluctuation of dot diameter due to the variation of the outer temperature and the increase of the number of printing sheets was not observed at all, and good single-sided and double-sided full color printing was feasible in either case of using the head shown in FIG. 12 or FIG. 14.

Cleaning was performed after printing by immersing the tips of the ink jet heads in Isopar G and impressing alternating current voltage of 0.5 kV/KHz for 40 seconds. Good printed matters could be obtained with necessitating no maintenance work for six months.

Further, when 150 dpi 64 channel multi-channel heads shown in FIG. 14 in place of the ink jet head shown in FIG. 12 were used, the same good result as above was obtained.

Example 3A

Figure 21:
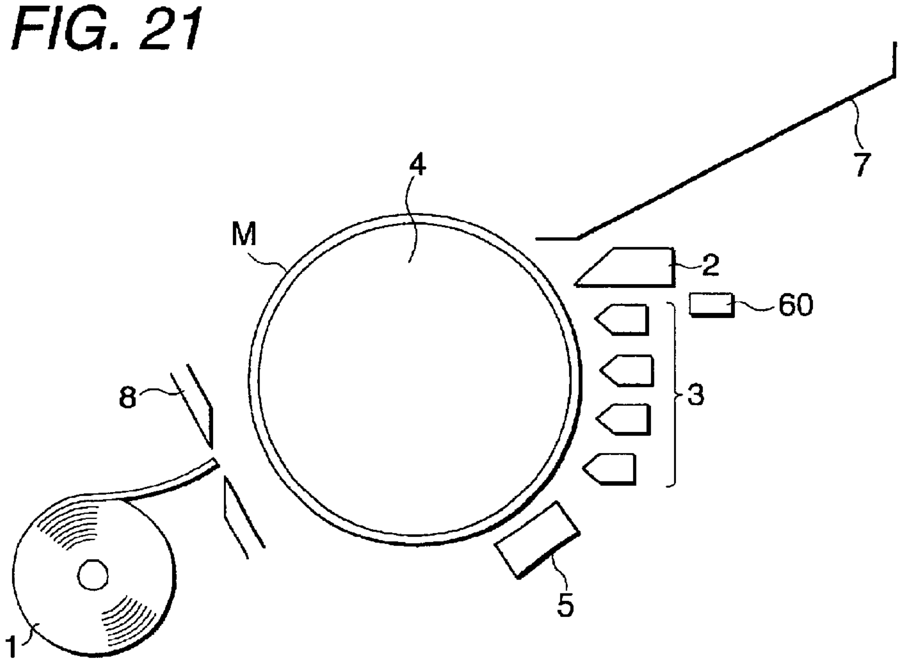
FIG. 21 is a schematic diagram showing the constitution of a single-sided four-color printing apparatus according to another example of the ink jet printing apparatus of the present invention, which performs printing by cutting a rolled printing medium and winding the cut printing medium round the counter drum.
Figure 22:
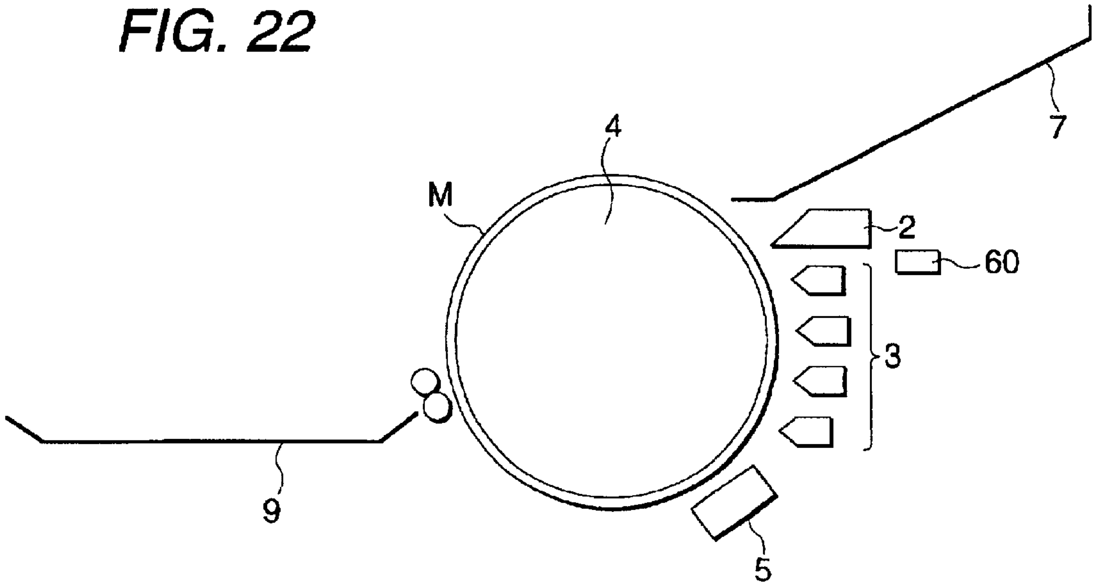
FIG. 22 is a schematic diagram showing the constitution of a printing apparatus of another example according to the ink jet printing apparatus of the present invention, which uses a sheet state recording medium.

Single-sided four-color full color printing was performed in the same manner as in Example 3 except for using the printing apparatus shown in FIG. 21 in place of the printing apparatus shown in FIG. 5. As a result, full color printed matters with sharp and high quality images could be obtained.

Cleaning was performed after printing by immersing the tips of the ink jet heads in isopropanol and impressing alternating current voltage of 0.5 kV/KHz for 20 seconds. Good printed matters could be obtained with necessitating no maintenance work for six months.

Example 4A

Figure 23:
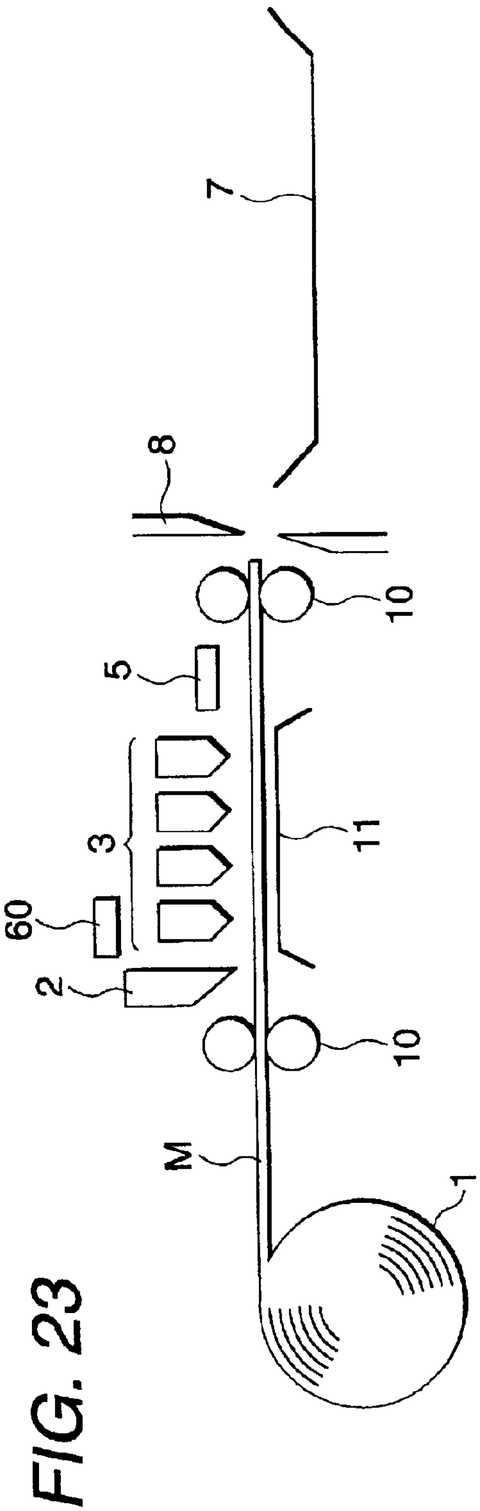
FIG. 23 is a schematic diagram showing the constitution of a printing apparatus according to another example of the ink jet printing apparatus of the present invention, which performs imaging by conveying a rolled printing medium with putting the printing medium between a pair of capstan rollers.
Figure 24:
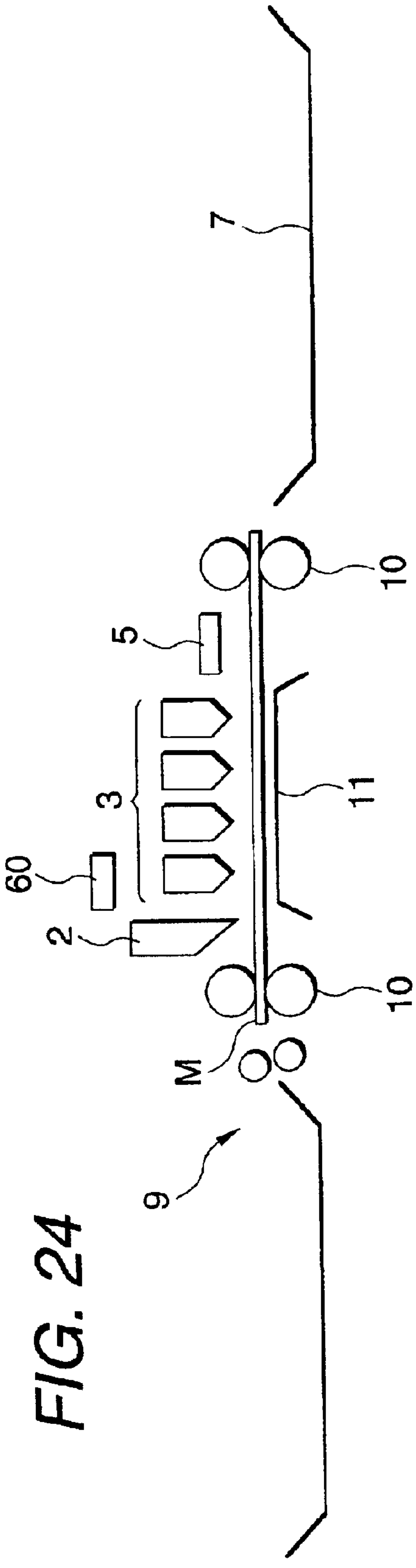
FIG. 24 is a schematic diagram showing the constitution of a printing apparatus according to another example of the ink jet printing apparatus of the present invention, which performs imaging by conveying a sheet state recording medium with putting the printing medium between a pair of capstan rollers.

Single-sided four-color full color printing was performed in the same manner as in Example 4 except for using the printing apparatuses shown in FIGS. 23 and 24 in place of the printing apparatuses shown in FIGS. 7 and 8. As a result, four-color full color good printed matters were obtained.

Cleaning was performed after printing by immersing the tips of the ink jet heads in their respective inks used and impressing positive direct current voltage of 1 kV and alternating current voltage of 0.5 kV/5 KHz for 30 seconds. Good printed matters could be obtained with necessitating no maintenance work for six months.

As shown above, according to the first preferred embodiment of the present invention, an ink jet printing method of ejecting an oily ink by utilizing an electrostatic field comprises the steps of directly forming an image on a printing medium on the basis of the signal of image data, and fixing the image to produce a printed matter, wherein cleaning is performed by immersing the tips of ink jet heads in a cleaning solution, and impressing voltage to the ink jet heads. Therefore, the ink jet heads are maintained clean at any time, thus the image does not cause blurring when printed on usual printing paper or non-absorptive plastic sheet not expensive high quality paper. Further, ejection of minute droplets is feasible according to the present invention, therefore, each dot image obtained is small in area and thin, and it becomes possible to perform printing of high-degree image data such as a photographic image inexpensively and at high speed.

Example 1B

Figure 27:
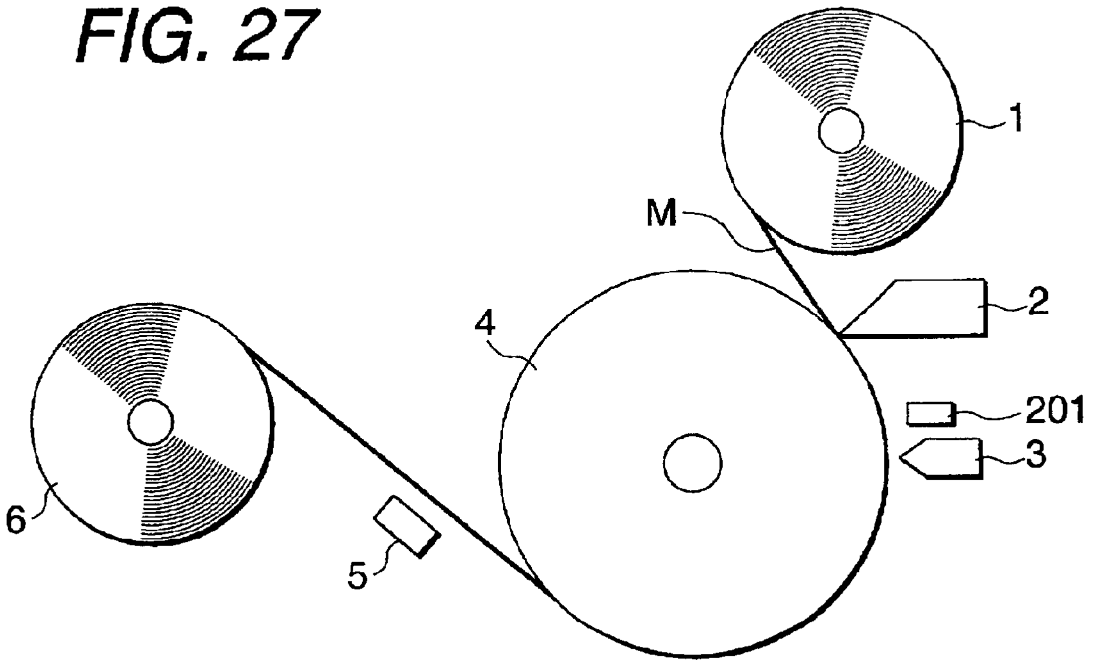
FIG. 27 is a schematic diagram showing the constitution of a web type printing apparatus for performing single-sided monochromatic printing, which is an example of the ink jet printing apparatus according to the present invention.

Image formation was carried out in the same manner as in Example 1, except that the printing apparatus shown in FIG. 27 was used in place of the printing apparatus shown in FIG. 1 and that the dusts on the printing medium were detected by optical detection, and the dusts on the printing medium were removed by suction with an air pump on the basis of the output. As a result, imaging defect due to dusts was not observed at all, and image deterioration by the fluctuation of dot diameter due to the variation of the outer temperature and the increase of printing time was not observed at all, thus good printing was feasible.

The image formed was enhanced by heating by means of a xenon flash fixing member (manufactured by Ushio Electric Co., Ltd., emission strength: 200 J/pulse). After printing, the ink jet recording unit was recessed from the position in the vicinity of the imaging drum by 50 mm for the protection of the ink jet head.

The obtained printed matters showed markedly clear image with no skip and blur. Cleaning was performed for 10 minutes after printing by supplying Isopar G to the head and dripping Isopar G from the aperture of the head, and the head was put in a cover filled with the vapor of Isopar G. Good printed matters could be obtained with necessitating no maintenance work for three months.

Example 2B

Figure 28:
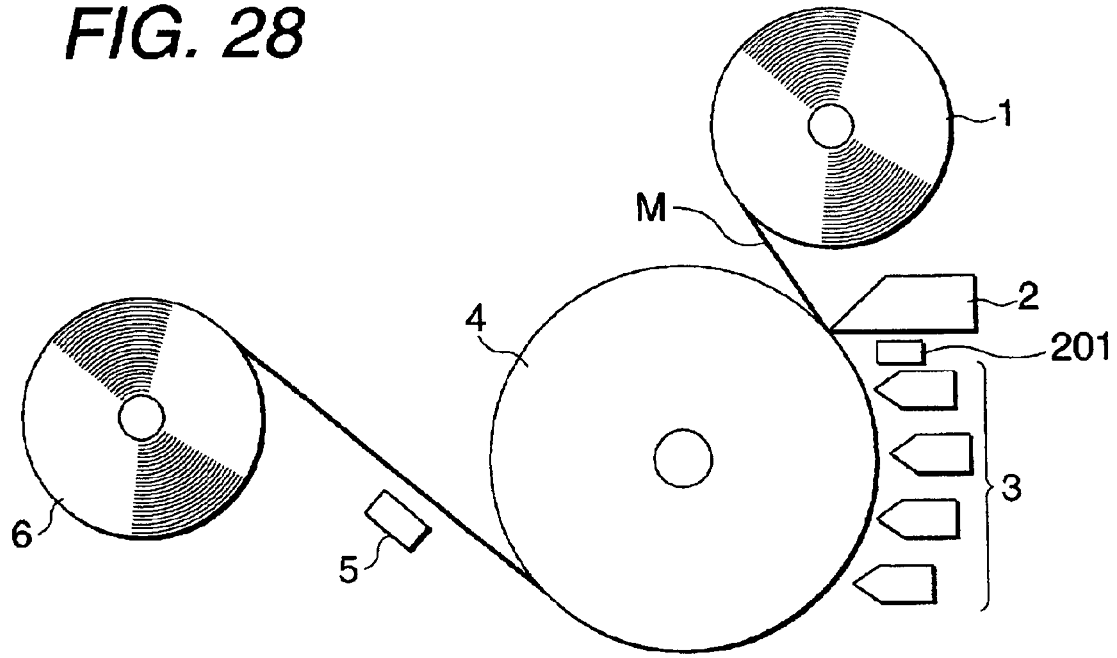
FIG. 28 is a schematic diagram showing the constitution of a web type printing apparatus for performing single-sided four-color printing, which is another example of the ink jet printing apparatus according to the present invention.
Figure 29:
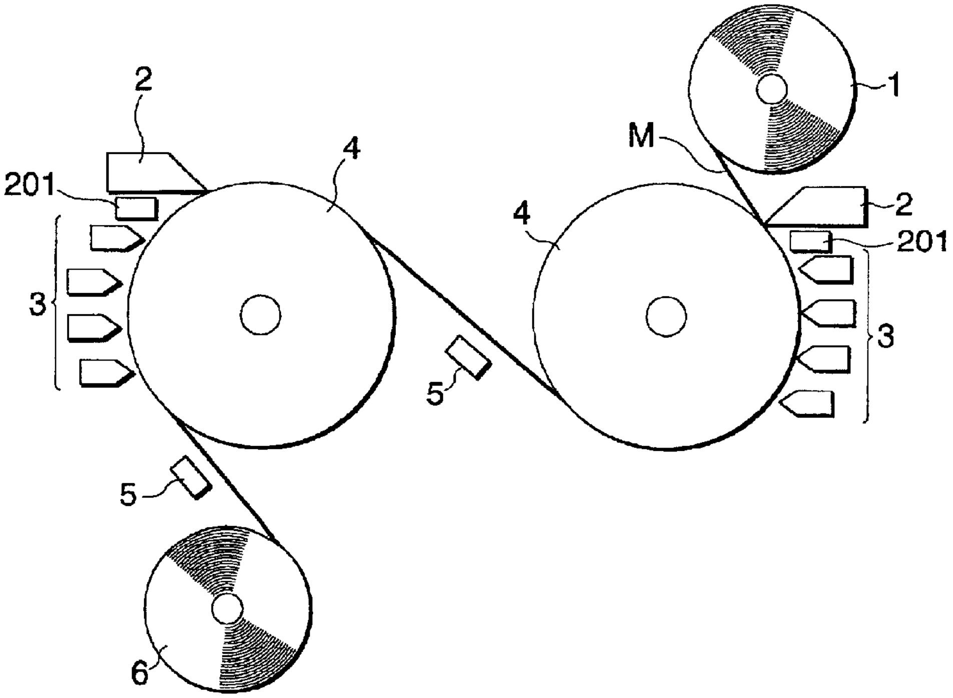
FIG. 29 is a schematic diagram showing the constitution of a double-sided four-color printing apparatus according to another example of the ink jet printing apparatus of the present invention.
Figure 30:
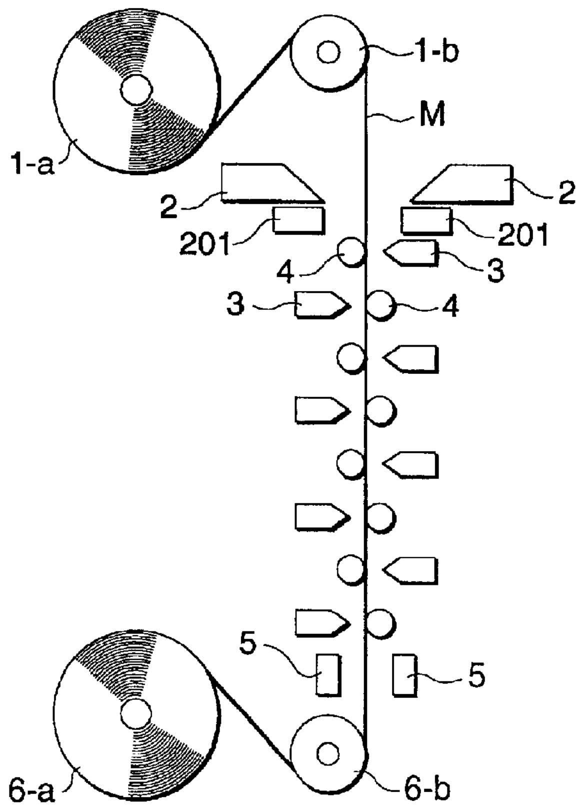
FIG. 30 is a schematic diagram showing the constitution of a double-sided four-color printing apparatus according to another example of the ink jet printing apparatus of the present invention.

Image formation was carried out in the same manner as in Example 2, except that the printing apparatuses shown in FIGS. 28 and 29 were used in place of the printing apparatuses shown in FIGS. 2 and 3, and that at the time ejection, the dusts on the printing apparatus was detected by optical detection and the dusts on the printing medium were removed by suction with an air pump on the basis of the output. As a result, imaging defect due to dusts was not observed at all, and image deterioration by the fluctuation of dot diameter due to the variation of the outer temperature and the increase of the number of printing sheets was not observed at all, and good single-sided and double-sided full color printing was feasible in either case of using the head shown in FIG. 12 or FIG. 14.

Cleaning was performed after printing by circulating Isopar G, and then bringing nonwoven fabric impregnated with Isopar G into contact with the tip of the head. Good printed matters could be obtained with necessitating no maintenance work for three months.

Further, when 150 dpi 64 channel multi-channel heads shown in FIG. 14 in place of the ink jet head shown in FIG. 12 were used, the same good result as above was obtained.

Example 3B

Single-sided four-color full color printing was performed in the same manner as in Example 3, except that the printing apparatus shown in FIG. 31 was used in place of the printing apparatus shown in FIG. 5 and that, at the time of the image formation, meniscus contours at the tips of four heads were detected, and imaging of all the heads was temporarily stopped due to the signals of the detection of abnormality, and the cleaning member of heads were actuated. As a result, printed matters having sharp and high quality images were obtained.

Example 4B

Figure 33:
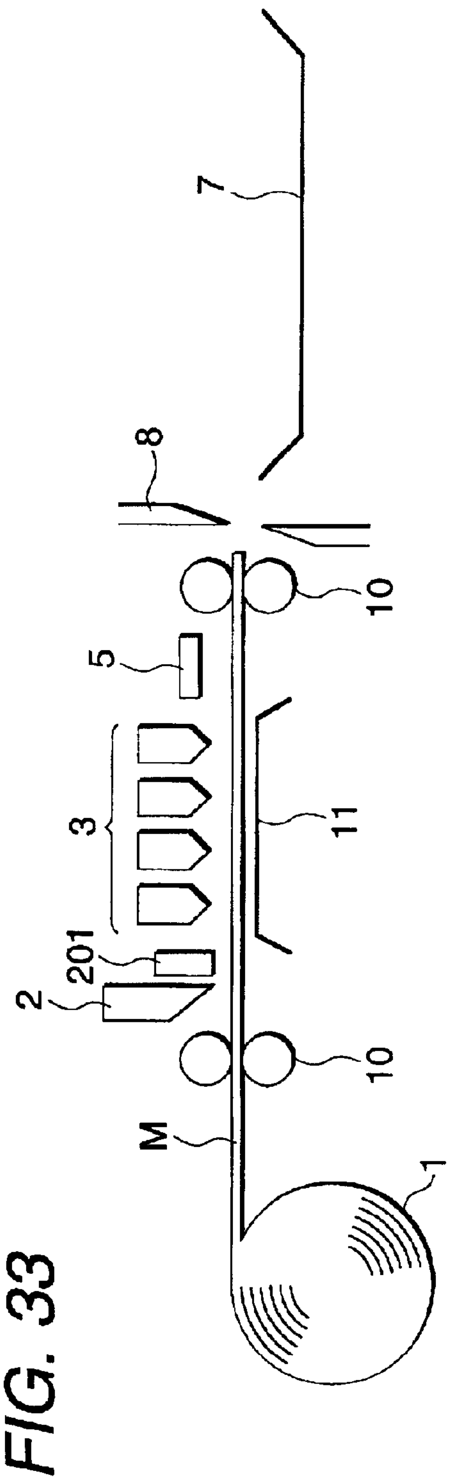
FIG. 33 is a schematic diagram showing the constitution of a printing apparatus according to another example of the ink jet printing apparatus of the present invention, which performs imaging by conveying a rolled printing medium with putting the printing medium between a pair of capstan rollers.
Figure 34:
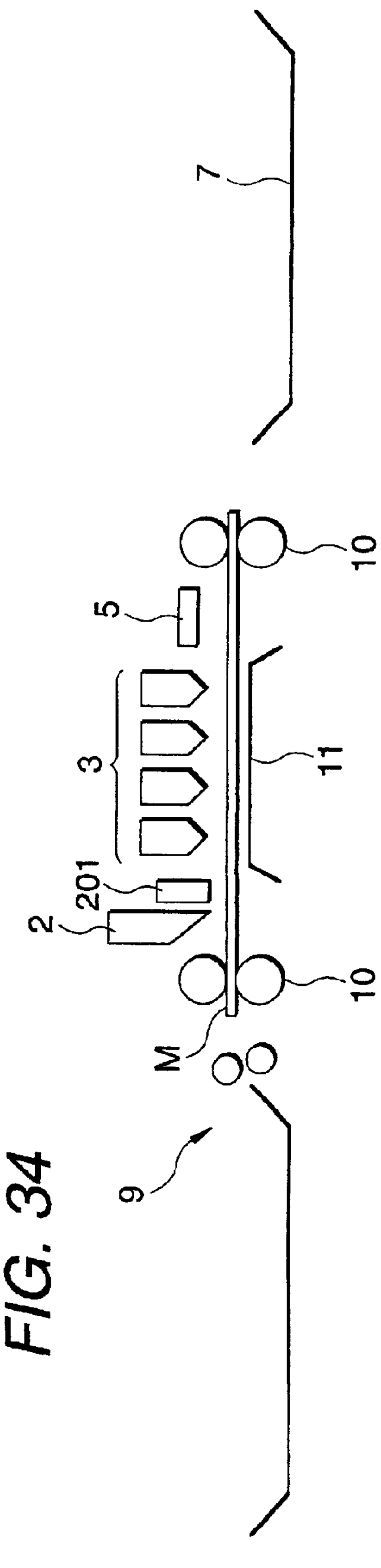
FIG. 34 is a schematic diagram showing the constitution of a printing apparatus according to another example of the ink jet printing apparatus of the present invention, which performs imaging by conveying a sheet state recording medium with putting the printing medium between a pair of capstan rollers.

Single-sided four-color full color printing was performed in the same manner as in Example 4, except that the printing apparatuses shown in FIGS. 33 and 34 were used in place of the printing apparatuses shown in FIGS. 7 and 8 and that at the time of the image formation, the dusts in the printing apparatus were detected by optical detection during imaging and all the heads were put in a protecting cover on the basis of the output and, at the same time, the dusts in the printing apparatus were collected by an electrostatic dust collector. As a result, four-color full color good printed matters were obtained.

According to the present invention, an ink jet printing method comprises the steps of directly forming an image on a printing medium on the basis of the signal of image data, and fixing the image to produce a printed matter, wherein the image is formed by an ink jet system of ejecting an oily ink by utilizing an electrostatic field. Therefore, the image does not cause blurring when printed on usual printing paper or non-absorptive plastic sheet not expensive high quality paper. Further, ejection of minute droplets is feasible according to the present invention, therefore, each dot image obtained is small in area and thin, and it becomes possible to perform printing of high-degree image data such as a photographic image inexpensively and at high speed.

While the invention has been described in detail and with reference to specific embodiments thereof, it will be apparent to one skilled in the art that various changes and modifications can be made therein without departing from the spirit and scope thereof.

What is claimed is:

1. An ink jet printing method which comprises:

directly forming an image on a printing medium on the basis of signals of image data; and fixing the image by heating to produce a printed matter, wherein:

said image formation is carried out by an ink jet system of ejecting an oily ink by an electrostatic field;

said image formation on the printing medium is carried out by sequentially using two or more inks; and each of said inks comprises at least a coloring material and a disperse particulate resin component.

2. The ink jet printing method according to claim 1, further comprising cleaning an ink jet head, said cleaning step comprising:

immersing said ink jet head in a cleaning solution; and applying voltage to said ink jet head.

3. The ink jet printing method according to claim 1, further comprising, when a malfunction happens, either or both of stopping the image formation and eliminating a cause of the malfunction.

4. The ink jet printing method according to claim 3, wherein at least one of the following steps is performed:

removing dusts on the surface of said printing medium either of both of before and during printing onto said printing medium; and cleaning said ink jet head at least after printing is finished.

5. The ink jet printing method according to claim 1, wherein said oily ink is a dispersion comprising at least:

a nonaqueous solvent having an intrinsic electrical resistance of $10^9$ Ω·cm or more and a dielectric constant of 3.5 or less; and colored particles dispersed in said solvent.

6. An ink jet printing apparatus comprising:

an image-forming member which directly forms an image on a printing medium on the basis of signals of image data; and an image-fixing member for fixing the formed image to obtain a printed matter, comprising a heating member, wherein:

said image-forming member comprises an ink jet imaging unit comprising at least two ink jet heads for ejecting at least a first and a second oily ink, respectively, which may be the same or different by an electrostatic field;

formation of said image on the printing medium is carried out by sequentially using two or more inks; and each of said inks comprises at least a coloring material and a disperse particulate resin component.

7. The ink jet printing apparatus according to claim 6, further comprising a cleaning member which cleans said ink jet head.

8. The ink jet printing apparatus according to claim 7, wherein said cleaning member performs cleaning by applying voltage to the ink jet head which is immersed in a cleaning solution.

9. The ink jet printing apparatus according to claim 6, further comprising at least one of a malfunction detecting member and a malfunctioning cause eliminating member, wherein according to an output from said malfunction detecting member, the image formation is temporarily stopped or said malfunctioning cause eliminating member operates.

10. The ink jet printing apparatus according to claim 9, wherein said malfunction detecting member is a unit which detects adhesion of a foreign matter on said ink jet head.

11. The ink jet printing apparatus according to claim 9, wherein said malfunction detecting member is a unit which detects at least one of a dust in said ink jet printing apparatus and a dust on said printing medium.

12. The ink jet printing apparatus according to claim 9, wherein said malfunction detecting member detects vibration of at least one of said ink jet printing apparatus and said ink jet head.

13. The ink jet printing apparatus according to claim 6, wherein said oily ink is a dispersion comprising at least:

a nonaqueous solvent having an intrinsic electrical resistance of $10^9$ Ω·cm or more and a dielectric constant of 3.5 or less; and colored particles dispersed in said solvent.

14. The ink jet printing apparatus according to claim 6, further comprising a dust-removing member which removes a dust on the surface of said printing medium either or both of before and during printing on the printing medium.

15. The ink jet printing apparatus according to claim 6, further comprising a counter drum which is arranged at a position opposed to said ink jet head via said printing medium and is rotatable so as to move said printing medium upon the image formation.

16. The ink jet printing apparatus according to claim 15, wherein said ink jet head has a single channel head or multi-channel head and is movable in an axis direction of said counter drum.

17. The ink jet printing apparatus according to claim 6, further comprising at least one pair of capstan rollers for conveying said printing medium upon the image formation with being put therebetween.

18. The ink jet printing apparatus according to claim 17, wherein said ink jet head has a single channel head or multi-channel head and is movable in an orthogonal direction to said conveyance direction of the printing medium.

19. The ink jet printing apparatus according to claim 15 or 17, wherein said ink jet head has a full line head having a length substantially the same as the width of said printing medium.

20. The ink jet printing apparatus according to claim 6, wherein said ink jet imaging unit further comprises an ink feeding member which feeds said oily ink to said ink jet head.

21. The ink jet printing apparatus according to claim 20, wherein said ink jet imaging unit further comprises an ink recovering member which recovers said oily ink from said ink jet head to circulate said oily ink.

22. The ink jet printing apparatus according to claim 6, wherein said ink jet imaging unit further comprising an ink tank for storing said oily ink and a stirring member which stirs said oily ink in said ink tank.

23. The ink jet printing apparatus according to claim 6, wherein said ink jet imaging unit further comprises an ink temperature controller for controlling the temperature of said oily ink in the ink tank.

24. The ink jet printing apparatus according to claim 6, wherein said ink jet imaging unit further comprises an ink concentration controller for controlling the concentration of said oily ink.

* * * * *